US010265898B2

(12) United States Patent
Kato et al.

(10) Patent No.: US 10,265,898 B2
(45) Date of Patent: Apr. 23, 2019

(54) INJECTION MOLDING APPARATUS AND INJECTION MOLDING METHOD

(71) Applicant: MAZDA MOTOR CORPORATION, Hiroshima (JP)

(72) Inventors: Hidekazu Kato, Aki-gun (JP); Takahiro Tanaka, Hiroshima (JP); Hiroki Tanizawa, Hiroshima (JP); Naoto Waku, Hiroshima (JP); Michihisa Iwamoto, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 132 days.

(21) Appl. No.: 15/307,189

(22) PCT Filed: Jan. 7, 2016

(86) PCT No.: PCT/JP2016/050295
§ 371 (c)(1),
(2) Date: Oct. 27, 2016

(87) PCT Pub. No.: WO2016/111321
PCT Pub. Date: Jul. 14, 2016

(65) Prior Publication Data
US 2017/0050361 A1  Feb. 23, 2017

(30) Foreign Application Priority Data

Jan. 9, 2015 (JP) .................................. 2015-003617
Jan. 9, 2015 (JP) .................................. 2015-003624
(Continued)

(51) Int. Cl.
B29C 45/27 (2006.01)
B29C 45/72 (2006.01)
(Continued)

(52) U.S. Cl.
CPC .............. *B29C 45/76* (2013.01); *B29C 45/26* (2013.01); *B29C 45/72* (2013.01); *B29K 2995/0005* (2013.01)

(58) Field of Classification Search
None
See application file for complete search history.

(56) References Cited

U.S. PATENT DOCUMENTS 3,591,893 A * 7/1971 Vicini ................. B29C 45/0408
425/119
2009/0291161 A1* 11/2009 Kayano ................... B29C 33/02
425/552

(Continued)

FOREIGN PATENT DOCUMENTS

CN     1724312 A    1/2006
CN   101052504 A   10/2007
(Continued)

OTHER PUBLICATIONS

An Office Action mailed by the State Intellectual Property Office of the People's Republic of China dated Nov. 2, 2018, which corresponds to Chinese Patent Application No. 201680001553.6 and is related to U.S. Appl. No. 15/307,189.
(Continued)

*Primary Examiner* — James Mellott
(74) *Attorney, Agent, or Firm* — Studebaker & Brackett PC

(57) ABSTRACT

The present application discloses an injection molding apparatus including a heating injector which heats and melts a conductive material to a molten temperature. The heating injector injects the conductive material into a mold with a cavity formation surface which forms a cavity. The injection molding apparatus includes an electrifying portion configured to apply a voltage; and a controller including an electrification controller configured to control the voltage
(Continued)

which is applied by the electrifying portion. The mold includes conductive portions at least on a part of the cavity formation surface. The conductive portions are insulated from each other. The electrifying portion applies the voltage between the conductive portions. The conductive material injected from the heating injector is electrically heated by the voltage, which is applied from the electrifying portion under control of the electrification controller, when the conductive material comes in contact with the conductive portions.

13 Claims, 41 Drawing Sheets

(30) Foreign Application Priority Data

Feb. 6, 2015 (JP) .................................. 2015-022546
Feb. 6, 2015 (JP) .................................. 2015-022547

(51) Int. Cl.
| | | |
|---|---|---|
| *B29C 71/00* | (2006.01) | |
| *B29C 65/04* | (2006.01) | |
| *B29C 65/34* | (2006.01) | |
| *B29C 65/48* | (2006.01) | |
| *B29C 45/76* | (2006.01) | |
| *B29C 45/26* | (2006.01) | |

(56) References Cited

U.S. PATENT DOCUMENTS

| | | |
|---|---|---|
| 2010/0044900 A1 | 2/2010 | Shikase et al. |
| 2012/0282424 A1 | 11/2012 | Tabeya et al. |
| 2013/0273264 A1 | 10/2013 | Mourou et al. |
| 2014/0295060 A1 | 10/2014 | Mourou et al. |

FOREIGN PATENT DOCUMENTS

| | | |
|---|---|---|
| CN | 101528440 A | 9/2009 |
| CN | 102725118 A | 10/2012 |
| DE | 198 02 855 A1 | 7/1998 |
| DE | 199 29 731 A1 | 1/2001 |
| DE | 10 2009 026 916 A1 | 12/2010 |
| DE | 10 2013 206 214 A1 | 10/2013 |
| JP | S49-027566 A | 3/1974 |
| JP | S57-126772 A | 8/1982 |
| JP | 2003-340896 A | 12/2003 |
| JP | 2004-345120 A | 12/2004 |
| JP | 2008-055894 A | 3/2008 |

OTHER PUBLICATIONS

International Search Report issued in PCT/JP2016/050295; dated Mar. 8, 2016.
An Office Action mailed by the German Patent and Trademark Office dated Sep. 17, 2018, which corresponds to German Patent Application No. 11 2016 000 080.4 and is related to U.S. Appl. No. 15/307,189.

* cited by examiner

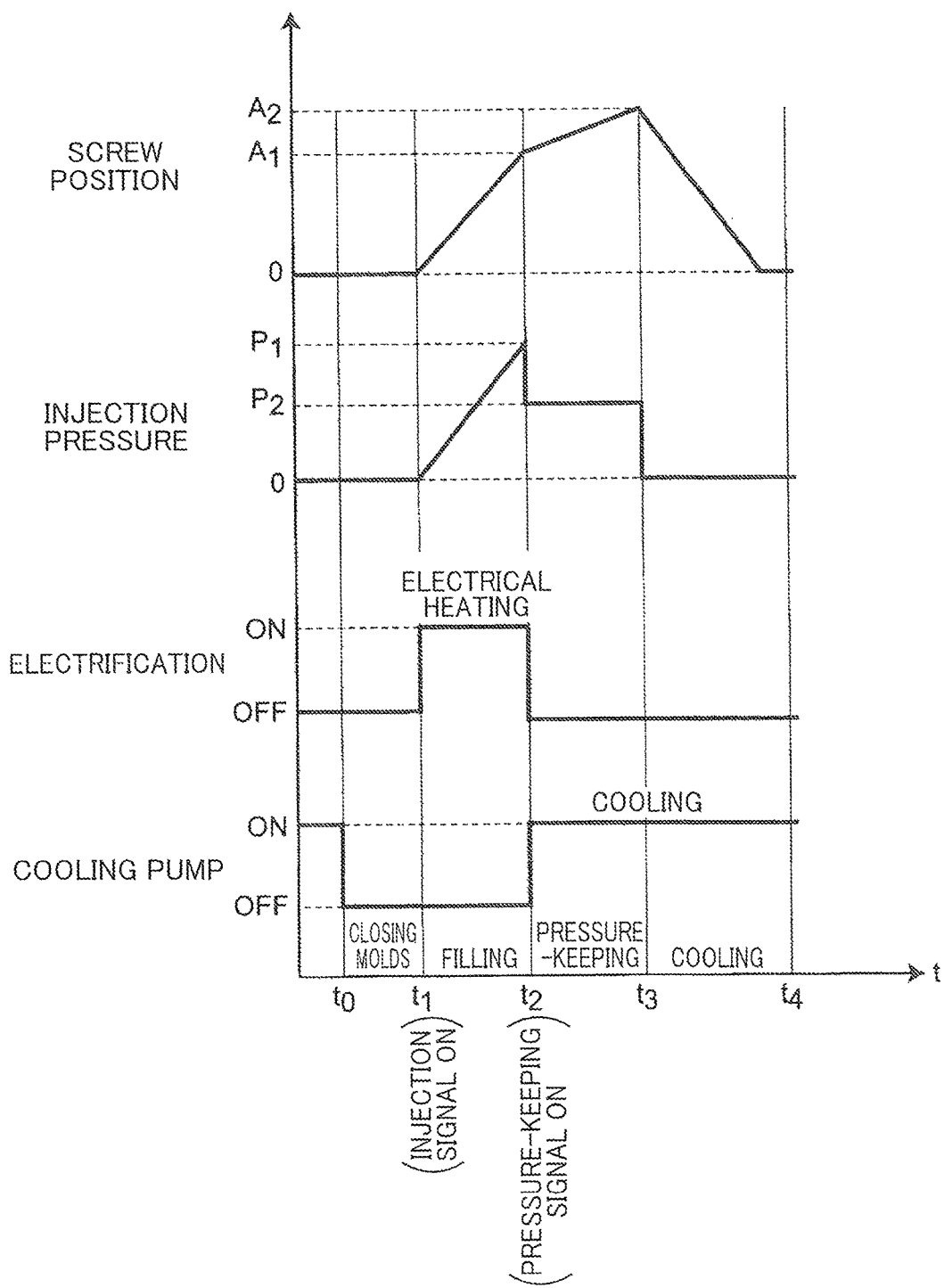

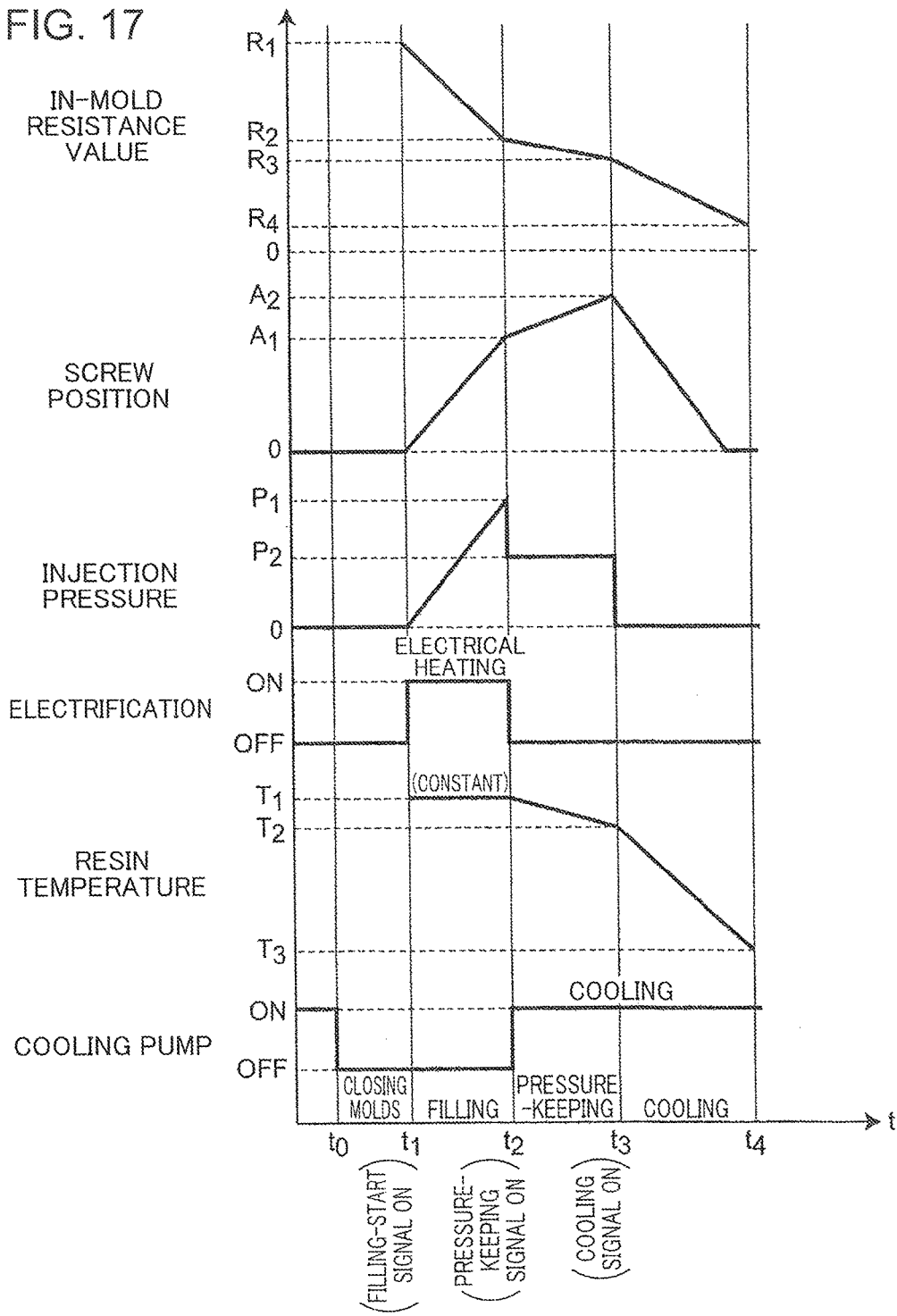

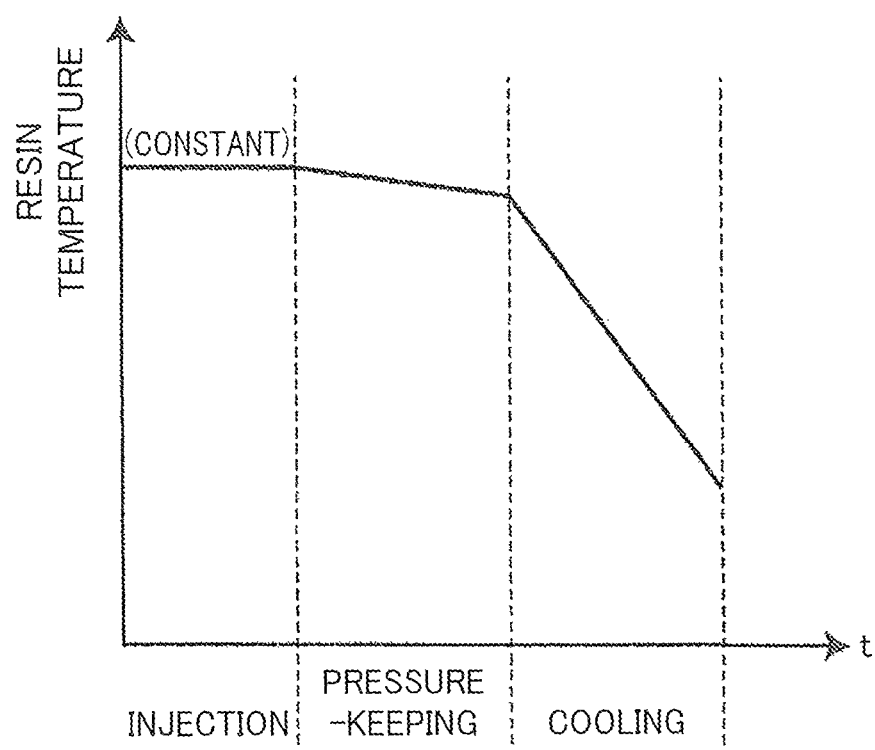

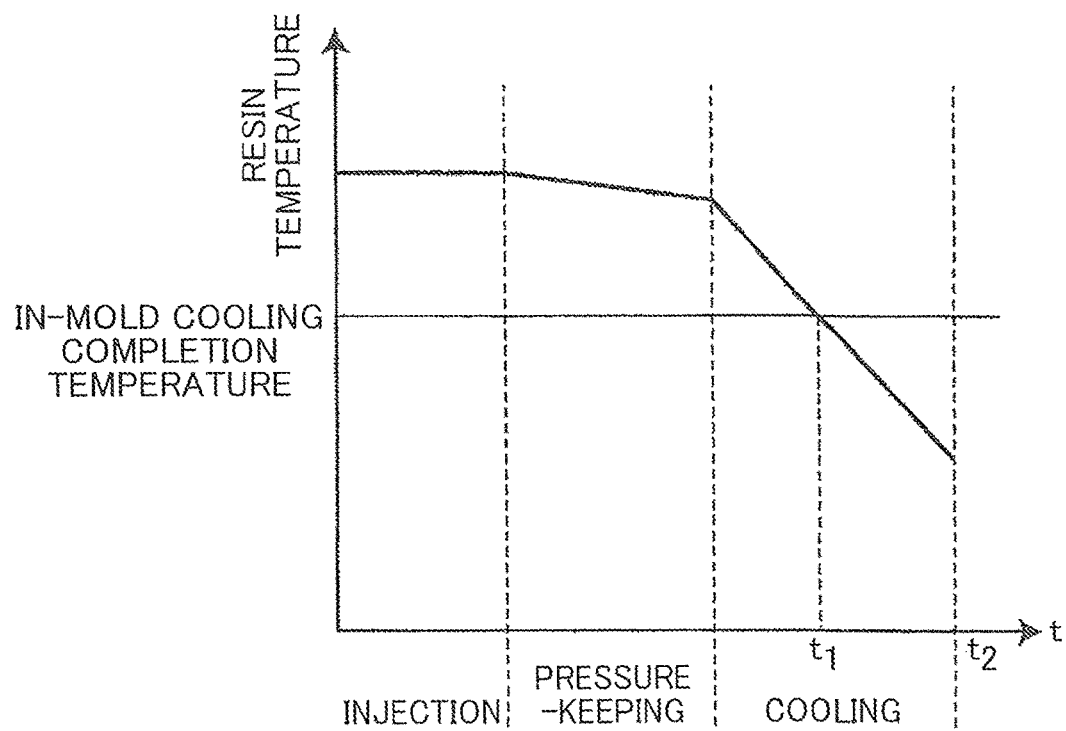

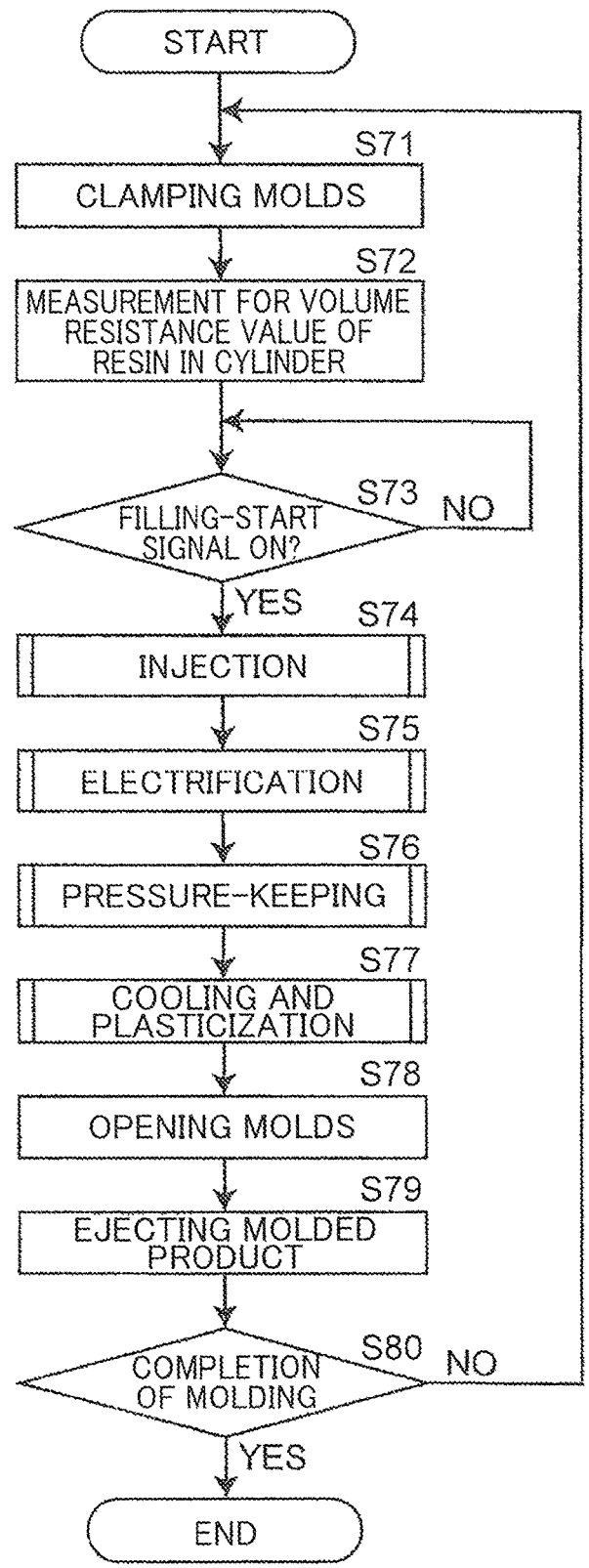

INJECTION MOLDING APPARATUS AND INJECTION MOLDING METHOD

TECHNICAL FIELD

The present invention relates to an injection molding apparatus and an injection molding method. In particular, the present invention relates to an injection molding apparatus and an injection molding method for injecting and molding a conductive material.

BACKGROUND ART

Conventionally, molded products made of resin have been produced by injection molding apparatuses. In general, an injection molding device utilizes heat by a heater and shearing heat by rotation of a screw to heat pellet-like thermoplastic resin fed into a hopper to a molten temperature. In short, the thermoplastic resin is molten. The injection molding apparatus moves the screw forward to fill a cavity of a mold with the molten resin, the mold being clamped in advance. A pressure to the filled molten resin is kept by a forward movement force of the screw. The filled molten resin is cooled in the cavity to become a molded product. The mold is then opened, so that the molded product is ejected.

With regard to the aforementioned injection molding apparatus, the molten resin spreads in the cavity from a gate of the mold to an end of the cavity so that the molten resin fills the cavity. Meanwhile, the molten resin is cooled from a surface portion coming into contact with a cavity formation surface of the mold. Accordingly, a resin temperature decreases. In particular, this results in an increase in viscosity of a leading end of the spreading molten resin. As a result of the viscosity increase, the molten resin becomes less mobile. Therefore, there is a risk of appearance defects in molded products, such as weld marks, flow marks, blowholes or defective transfer under a deficient injection pressure of the molten resin which is injected from a nozzle into the cavity.

Recently, techniques of injecting and molding large and thin molded products are required to meet need for further weight reduction of large automobile components made of resin such as bumpers, and a size increase and a weight reduction in frames for liquid crystal displays of liquid crystal televisions or the like. With regard to such large and thin molded products obtained by the conventional injection molding device, there is a risk of a short shot that the cavity is not filled with molten resin till the end because of a deficient injection pressure in addition to the aforementioned appearance defects.

An increase in an injection pressure may work for preventing the short shot. In this case, it is necessary to clamp a mold at a mold-clamping pressure against the injection pressure required for the injection molding. Therefore, it is necessary to prepare a large injection molding apparatus having a high mold-clamping pressure and a large mold endurable against the injection pressure and the mold-clamping pressure. Alternatively, an increase in gates or thickening a molded product may work for preventing the short shot. However, these techniques have various problems which are, for example, an increase in portions at which weld marks occur, and an increase in material costs.

Patent Document 1 discloses so-called heat-and-cool molding in which a mold is repeatedly heated and cooled. According to Patent Document 1, molten resin injected into a cavity is indirectly heated by heating the mold during the injection. Since a temperature of the molten resin is less likely to decrease, it is not necessary to increase an injection pressure and change the number of gates or the thickness of a molded product.

Recently, there has been a demand for techniques of providing molded products made of conductive resin required for electrostatic coating by mixing conductive filler with base insulative resin. Additionally, there has been another demand for techniques of injecting and molding a conductive material containing a resin material mixed with carbon fibers or the like in order to strengthen molded products.

As one of these techniques, Patent Document 2 shows electrifying a conductive molten material which flows in a passage of a nozzle of an injection molding apparatus. The molten material is directly heated by Joule heat immediately before filling a cavity of a mold.

With regard to the injection molding apparatus disclosed in Patent Document 1, the mold is heated, the mold having larger heat capacity than the molten resin to be filled. It takes a long time to cool the mold (i.e. to cool a molded product in the mold) after injection of the molten resin and pressure-keeping because the mold has a high temperature. Accordingly, this may lengthen an injection molding cycle from an injection process to an ejection process for a molded product.

With regard to the techniques disclosed in Patent Document 2, the molten resin injected from the nozzle into the cavity is cooled by the mold while the molten resin moves in the cavity, as described above. Therefore, the problems of the appearance defects or the like are not solved, the problems being caused by a reduction in fluidity.

The aforementioned problems are also seen in injection molding apparatuses for injecting and molding a metal material of aluminum or the like in a mold such as a die casting machine.

PRIOR ART DOCUMENT

Patent Document

Patent Document 1: JP 2008-055894 A
Patent Document 2: JP 2003-340896 A

SUMMARY OF INVENTION

One object of the present invention is to provide techniques which contribute to a reduction in a risk of appearance defects in molded products without unnecessarily lengthening an injection molding cycle.

An injection molding apparatus according to one aspect of the present invention includes a heating injector which heats and melts a conductive material to a molten temperature, the heating injector injecting the conductive material into a mold with a cavity formation surface which forms a cavity. The injection molding apparatus includes an electrifying portion configured to apply a voltage; and a controller including an electrification controller configured to control the voltage which is applied by the electrifying portion. The mold includes conductive portions at least on a part of the cavity formation surface, the conductive portions being insulated from each other. The electrifying portion applies the voltage between the conductive portions. The conductive material injected from the heating injector is electrically heated by the voltage, which is applied from the electrifying portion under control of the electrification controller, when the conductive material comes in contact with the conductive portions.

An injection molding method according to another aspect of the present invention is used for injecting a conductive material into a mold having a cavity formation surface, which forms a cavity, in order to mold the conductive material. The injection molding method includes: a heating and melting process of heating and melting the conductive material to a molten temperature; an injecting process of injecting the heated and molten conductive material into the mold; and an electrifying process of applying a voltage between conductive portions provided at least on a part of the cavity formation surface so that the injected conductive material is electrically heated when the injected conductive material comes in contact with the conductive portions which are insulated from each other.

The aforementioned techniques contribute to a reduction in a risk of appearance defects in molded products without unnecessarily lengthening an injection molding cycle.

The object, features and advantages of the present invention will be clarified by the following detailed description and the accompanying drawings.

BRIEF DESCRIPTION OF DRAWINGS

FIG. 7 is a time chart showing operations of the injection molding apparatus.

FIG. 17 is a time chart showing operations of an injection molding apparatus.

FIG. 19B is a graph showing a resin temperature change in the injecting process, the pressure-keeping process and the cooling process.

FIG. 22 is a graph showing a resin temperature change in the injecting process, the pressure-keeping process and the cooling process.

FIG. 23 is a flowchart showing an injection molding cycle (the twelfth embodiment).

DESCRIPTION OF EMBODIMENTS

<First Embodiment>

An exemplary injection molding apparatus 1 according to the first embodiment is described with reference to FIGS. 1 to 7.

Figure 1:
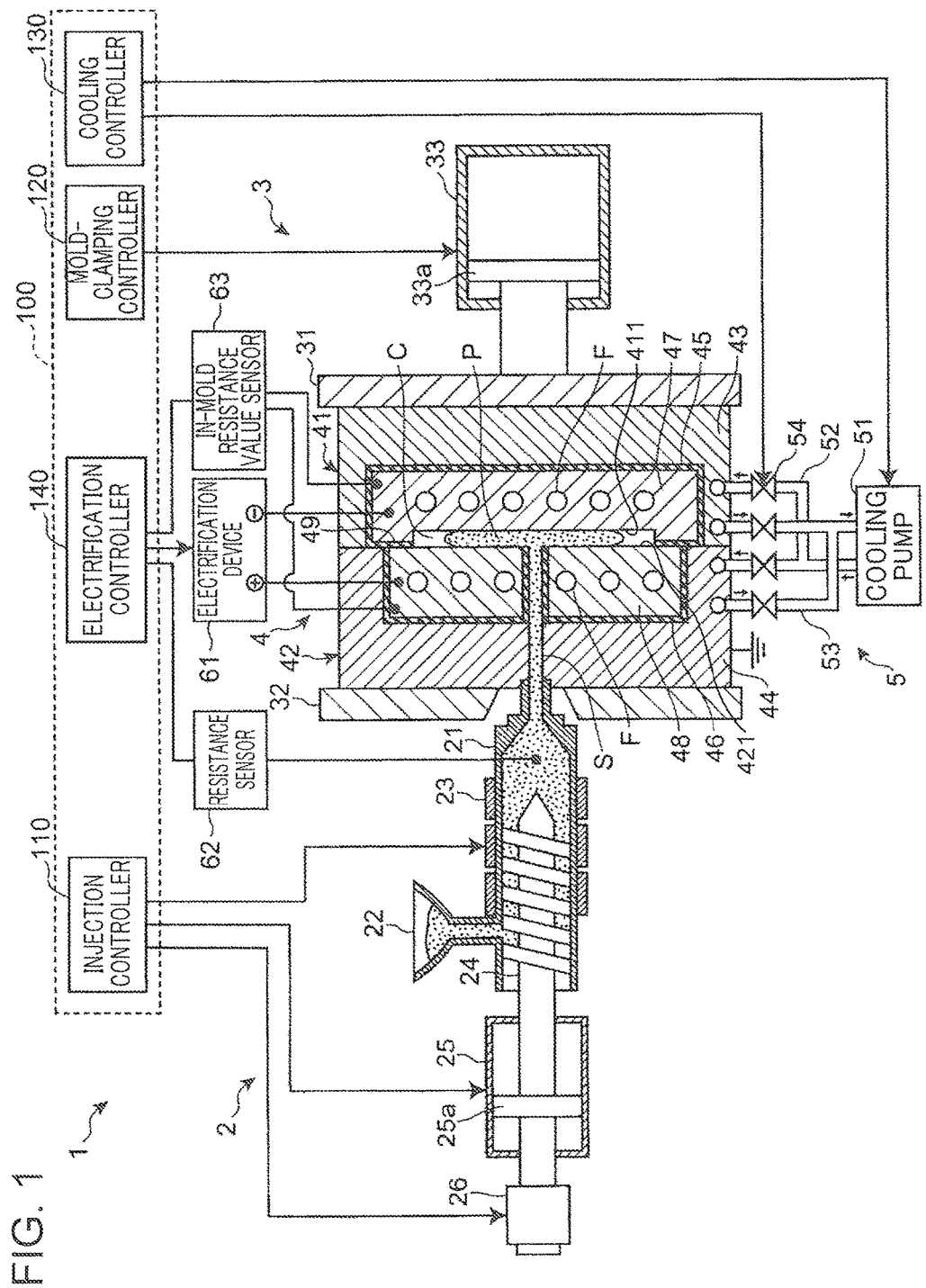
FIG. 1 is a schematic view showing an overall configuration of an injection molding apparatus according to the first embodiment.

As shown in FIG. 1, the injection molding apparatus 1 includes a heating injection device 2, and a mold-clamping device 3 which faces the heating injection device 2. The heating injection device 2 and the mold-clamping device 3 are mounted on a base frame (not shown).

The heating injection device 2 includes an injection cylinder 21. A hopper 22 is attached to an upper portion of the injection cylinder 21. The hopper 22 is used to feed pellet-like thermoplastic resin to the injection cylinder 21, the pellet-like thermoplastic resin being a raw material of molded products. The injection cylinder 21 has a band heater 23 wound around the periphery of the injection cylinder 21 to heat the thermoplastic resin to a molten temperature. Accordingly, the thermoplastic resin is heated and melted. A rotatable screw 24 is provided in the injection cylinder 21. The screw 24 is movable forward and backward. In the present embodiment, the heating injector is exemplified by the heating injection device 2.

An injection cylinder device 25 is arranged behind the screw 24 (on the left-side in FIG. 1). The injection cylinder device 25 is used as a drive source to move the screw 24 forward and backward. The injection cylinder device 25 is provided with an injection piston 25a which is moved forward and backward by working oil which is supplied through a pipe (not shown).

The rear end of the screw 24 is connected to the injection piston 25a. The forward and backward movement of the injection piston 25a in the injection cylinder device 25 moves the screw 24 forward and backward in the injection cylinder 21. A position detector (not shown) is connected to the injection piston 25a. The position detector detects a screw position of the screw 24.

A batching motor 26 is situated behind the injection cylinder device 25. The batching motor 26 is used as a drive source to rotate the screw 24. The injection cylinder 21, the screw 24, the injection cylinder 25 and the batching motor 26 are coaxially arranged to form the heating injection device 2.

A mold device 4 is coupled to the mold-clamping device 3. The mold device 4 includes a movable mold 41 and a fixed mold 42. The movable and fixed molds 41, 42 have contact surfaces, respectively, which come into contact with each other when the mold device 4 is closed. The mold-clamping device 3 includes a movable-side attachment plate 31, to which the movable mold 41 is attached, a fixed-side attachment plate 32, to which the fixed mold 42 is attached, and a mold-clamping cylinder device 33, which works as a drive source to move the movable-side attachment plate 31 forward and backward. The fixed-side attachment plate 32 and the mold-clamping cylinder device 33 are coupled by a tie-bar (not shown). The movable-side attachment plate 31 may move forward and backward along the tie-bar. In the present embodiment, the mold is exemplified by the movable and fixed molds 41, 42. The first member is exemplified by one of the movable and fixed molds 41, 42. The second member is exemplified by the other of the movable and fixed molds 41, 42. The first contact surface is exemplified by one of the contact surfaces of the movable and fixed molds 41, 42. The second contact surface is exemplified by the other of the contact surfaces of the movable and fixed molds 41, 42.

A linearly movable mold-clamping piston 33a is situated in the mold-clamp cylinder device 33. The mold-clamping piston 33a is moved forward and backward in the mold-clamping cylinder device 33 by the working oil supplied into the mold-clamping cylinder device 33 through the pipe. The movable-side attachment plate 31 is connected to a front end (the left end in FIG. 1) of the mold-clamping piston 33a. The forward and backward movement of the mold-clamping piston 33a in the mold-clamping cylinder device 33 moves the movable mold 41 forward and backward together with the movable-side attachment plate 31. Therefore, when the mold-clamping piston 33a moves forward (leftward in FIG. 1), the movable mold 41 moves forward together with the movable-side attachment plate 31 to close and clamp the mold device 42. The movable mold 41 moves backward together with the movable-side attachment plate 31 to open the mold device 42 when the mold-clamping piston 33a moves backward (moves rightward in FIG. 1).

An ejector (not shown) is arranged on a rear surface (the right surface in FIG. 1) of the movable attachment-side plate 31. When the mold device 4 is opened, a molded product is ejected from the cavity C under an actuation of the ejector. Consequently, the molded product is taken from the mold device 4. FIG. 1 shows the mold-clamping device 3 of the direct movement type. However, the mold-clamping device 3 may be a toggle type having a toggle mechanism situated between the mold-clamping cylinder device 33 and the movable-side attachment plate 31.

When the mold device 4 is closed by the movable and fixed molds 41, 42, the cavity C is formed inside the mold device 4. Passages F are formed in the movable and fixed molds 41, 42, respectively, so that coolant such as cooling water flows through the passages F.

The injection molding apparatus 1 includes a cooling device 5 configured to cool the mold device 4. The cooling device 5 includes a cooling pump 51. The cooling pump 51 is connected to the movable and fixed molds 41, 42 via a supply pipe 52 and a discharge pipe 53 for the coolant. The supply and discharge pipes 52, 53 are provided with regulation valves 54, respectively, which regulate a flow of the coolant. When the cooling pump 51 of the cooling device 5 is driven under a state in which all the regulation valves 54 are open, the coolant flows back to the respective passages F formed in the movable and fixed molds 41, 42. Accordingly, the movable and fixed molds 41, 42 are cooled. The cooling pump 5 may be individually provided for each of the movable and fixed molds 41, 42 in order to independently cool them. In the present embodiment, the cooler is exemplified by the cooling device 5.

The coolant may be insulative liquid. Electrical insulating oil and fluorine-based inactive liquid or the like disclosed in the Japanese Industrial Standards (JIS C 2320) may be used as the insulative liquid. The insulative liquid may be selected on the basis of cooling capability, a use temperature (a maximal temperature of the mold device 4), desired pressure resistance capability (a maximal voltage applied by an electrification device 61). If appropriate liquid is selected, there may be a low risk of electric leakage to the cooling pump 51 via the coolant at the time of the electrical heating.

A unique structure of the injection molding apparatus 1 is described.

As shown in FIG. 1, each of the movable and fixed molds 41, 42 has a fit-in mode structure. The movable mold 41 has a mold shell 43 and a conductive portion 47 provided inside the mold shell 43 via an insulator 45. Likewise, the fixed mold 42 has a mold shell 44 and a conductive portion 48 provided inside the mold shell 44 via an insulator 46. The insulators 45, 46 insulate the conductive portions 47, 48 from the outer surfaces of the movable and fixed molds 41, 42. The movable mold 41 has a cavity formation surface 411. The fixed mold 42 has a cavity formation surface 421. The cavity formation surface 411 defines the cavity C in cooperation with the cavity formation surface 421. The conductive portions 47, 48 are provided on the cavity formation surfaces 411, 421 of the movable and fixed molds 41, 42. In the present embodiment, the first insulator is exemplified by the insulators 45, 46.

For example, the insulator 46 may be at least one selected from alumina, zirconia, silicon nitride, silicon carbide, polytetrafluoroethylene (FTFE), perfluoro alkoxyl alkane (PFA), polyphenylene sulfide (PPS), quartz, titanium oxide, polyether ether ketone (PEEK), polyimide, polyamide-imide and the like. For example, the insulator 46 may be placed between the mold shells 42, 43 and the conductive portions 47, 48 by coating, thermal spraying, spraying, transferring, inserting, in-mold molding, laminating or the like. The insulator 46 may be an insulating layer provided on a surface of a metal member. The insulating layer may be made of the aforementioned resin or ceramics. The insulator 46 may be selected on the basis of desired pressure resistance capability (a maximal voltage applied by the electrification device 61), a use temperature (a maximal temperature of the mold device 4) and the like.

The conductive portions 47, 48 are preferably made of a metal material in terms of good conductivity. For example, gold, silver, coper, iron, nickel, chromium, aluminum, titanium, stainless or alloy thereof may be used as the metal material. Each of the conductive portions 47, 48 may be a single-layered structure consisting of one metal layer, or multi-layered structure including different metal layers.

The contact surface 41a of the movable mold 41 has an insulator 49 which electrically insulates the conductive portions 47, 48 from each other. The insulator 49 is a layer to cover a part of the contact surface 41a of the movable mold 41 (the portion configured by the conductive portion 47). The insulator 49 may be provided on at least one of the contact surfaces 41a, 42a of the movable and fixed molds 41, 42. In the present embodiment, the second insulator is exemplified by the insulator 49.

The injection molding apparatus 1 includes the electrification device 61 configured to apply a voltage between the conductive portions 47, 48 of the mold device 4. In the present embodiment, the electrification device 61 works as a direct current power source configured to apply a constant voltage. Alternatively, the electrification device 61 may work as an alternating current power source. In the present embodiment, the electrifying portion is exemplified by the electrification device 61.

A resistance sensor 62 is provided on the heating injection device 2. The resistance sensor 62 detects an electrical resistance value of the conductive material P molten by the band heater 23 in the injection cylinder 21. A sensor signal output from the resistance sensor 62 is input to an electrification controller 140 (described later).

An in-mold resistance value sensor 63 is connected to the conductive portions 47, 48 of the mold device 4. The in-mold resistance value sensor 63 detects an electrical resistance value between the conductive portions 47, 48. In the present embodiment, a current sensor is used as the in-mold resistance value sensor 63. The current sensor may detect leak current flowing from the conductive portion 48 to the conductive portion 47 in the mold device 4 via the insulating layer 49 before the cavity C is filled with the conductive material P. In the present embodiment, the measuring portion is exemplified by the in-mold resistance value sensor 63. The parameter value is exemplified by the electrical resistance value which is detected by the in-mold resistance value sensor 63. Alternatively, the parameter value may be represented by another amount which contributes to a calculation of the electrical resistance value between the conductive portions 47, 48.

A control unit 100 has an injection controller 110, a mold-clamping controller 120, a cooling controller 130 and an electrification controller 140. The injection controller 110 controls the injection cylinder device 25, the batching motor 26 and the band heater 23 of the heating injection device 2. Therefore, the heating injection of the conductive material P is mainly controlled by the injection controller 110. The mold-clamping controller 120 controls the mold-clamping cylinder device 33 of the mold-clamping device 3. The cooling controller 130 controls the cooling pump 51 and the respective regulation valves 54 of the cooling device 5. The electrification controller 140 controls a voltage applied from the electrification device 61. In the present embodiment, the electrification controller 140 performs ON/OFF control of a predetermined voltage to be output from the electrification device 61. Alternatively, the electrification controller 140 may control a voltage value to be output from the electrification device 61. In the present embodiment, the controller is exemplified by the control unit 100.

The conductive material P as a material for injection molding is a mixture of conductive filler with base material made of insulative thermoplastic resin, the mixture having desired characteristics. For example, the thermoplastic resin may be at least one selected from polypropylene, polyamide, polysulfone sulfide, polyimide, polyether ketone, polyether ether ketone, ABS, ASA, polycarbonate and the like. For example, the conductive filler may be at least one selected from a metal-based conductive agent such as metal fibers, metal powders, and metal flakes, or carbon-based conductive agent such as carbon fibers, carbon conjugated fibers, carbon black, graphite and the like. The conductive material P may be a metal material itself. The metal material may be at least one selected from nonferrous metal such as zinc, aluminum, magnesium and alloy thereof.

Figure 2:
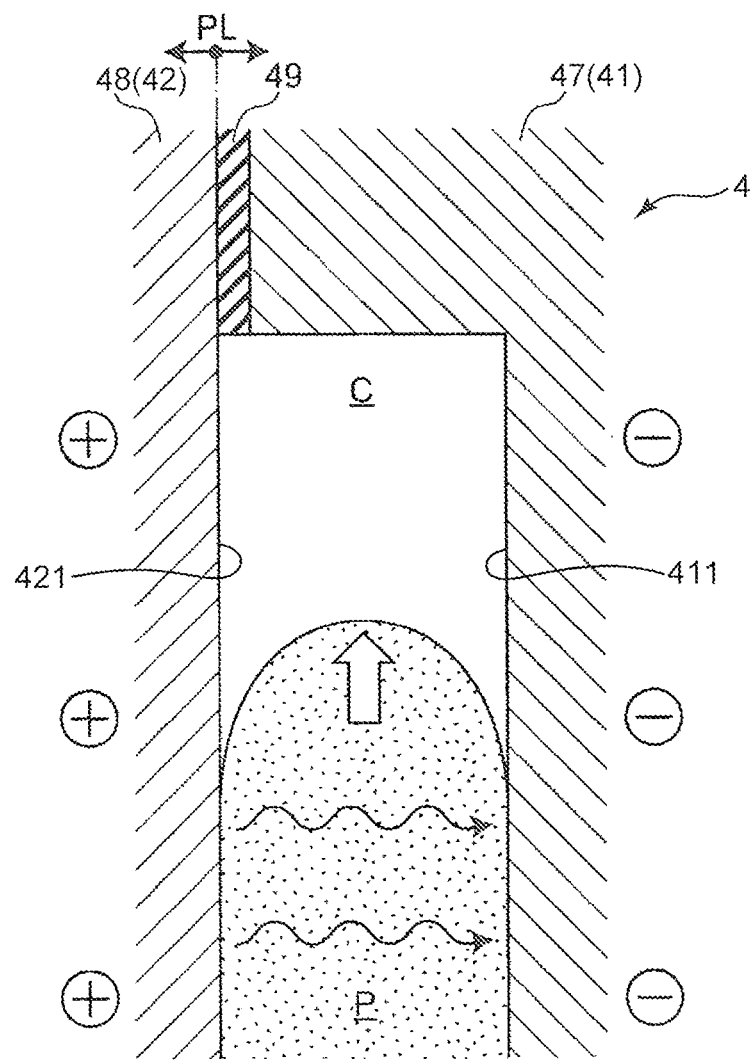
FIG. 2 is an enlarged cross sectional view of a part of FIG. 1 to show electrical heating of a conductive material.

The principle of the electrical heating for the conductive material P is described with reference to FIGS. 1 and 2. The reference symbol PL in FIG. 2 means a parting line at which the contact surfaces of the movable and fixed molds 41, 42 of the mold device 4 come into contact with each other.

The conductive material P injected into the cavity C from a nozzle (not shown) at the tip of the injection cylinder 21 via spool S of the mold device 4 (c.f. FIG. 1) to fill the cavity C moves in the cavity C (upward in FIG. 2), and goes toward an end of the cavity C (c.f. FIG. 2). The conductive material P is cooled from a surface portion coming into contact with the cavity formation surfaces 411, 421 of the movable and fixed molds 41, 42. A current flows to the conductive material P when a voltage is applied between the conductive portions 47, 48 so that the conductive portion 48 has a higher potential than the conductive portion 47. The current flows from the conductive portion 48 to the conductive portion 47 in the depth direction of the cavity C (rightward in FIG. 2 (c.f. the wavy arrow)). This electrification causes Joule heat due to electrical resistance of the conductive material P itself. Therefore, the conductive material P is electrically heated. Accordingly, the cavity C is filled with the conductive material P till the end while a resin temperature of the conductive material P is kept (i.e. under a state that a reduction in fluidity because of high viscosity at the tip of the moving conductive material P is suppressed).

Meanwhile, the current does not directly flow from the conductive portion 48 to the conductive portion 47 since the conductive portions 47, 48 are insulated from each other by the insulator 49 situated between the contact surfaces.

Figure 3:
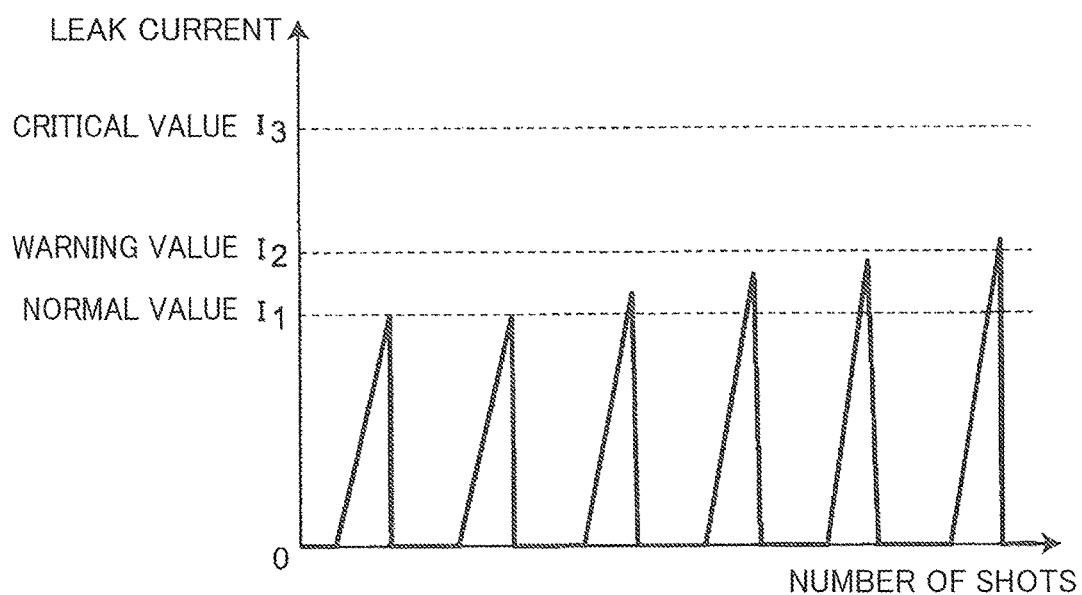
FIG. 3 is a graph showing a change in a leak current between conductive portions every shot.

A leak current in the insulator 49 between the conductive portions 47, 48 is described with reference to FIG. 3.

As described above, a voltage is applied to the conductive portions 47, 48 to electrically heat the conductive material P. The insulator 49 is used to insulate the conductive portions 47, 48 from each other. The insulator 49 deteriorates year by year as an increase in shots by the injection molding apparatus 1, for example, because of abrasion, a use temperature, a use pressure, an electrification voltage, ultraviolet rays and the like. Accordingly, insulating characteristics of the insulator 49 gradually worsens. FIG. 3 shows a leak current flowing between the conductive portions 47, 48 via the insulator 49 at the time of the electrical heating. As shown in FIG. 3, a peak value of the leak current gradually increases as the insulating characteristics worsen.

The insulating characteristics of the insulator 49 may suddenly worsen because of abrupt incidences, for example, indentation, scratching, deformation, overheating, overpressure, overvoltage and the like. It is difficult to predict the sudden deterioration of the insulating characteristics caused by such abrupt incidences. Therefore, it is preferred to measure a current peak value of the leak current in the insulator 49 every shot in order to monitor the insulating characteristics of the insulator 49.

The electrification controller 140 (described later) includes a memory or the like. A preset normal value I1, warning value I2, and critical value I3 are stored in the memory or the like of the electrification controller 140 as thresholds for determining an insulating state of the insulting member 49. A current peak value of a leak current in the insulator 49 of a new mold device 4 is set as the normal value I1. When the current peak value of the measured leak current is higher than the normal value I1 but not higher than the critical value I2 at a certain number of shots, it is determined that production of molded products by the injection molding apparatus 1 may be continued. When the current peak value is higher than the warning value I2 but not higher than the critical value I3, it is determined to warn an operator of the injection molding apparatus 1. When the current peak value is not lower than the critical value I3, it is determined to stop the production.

Figure 5:
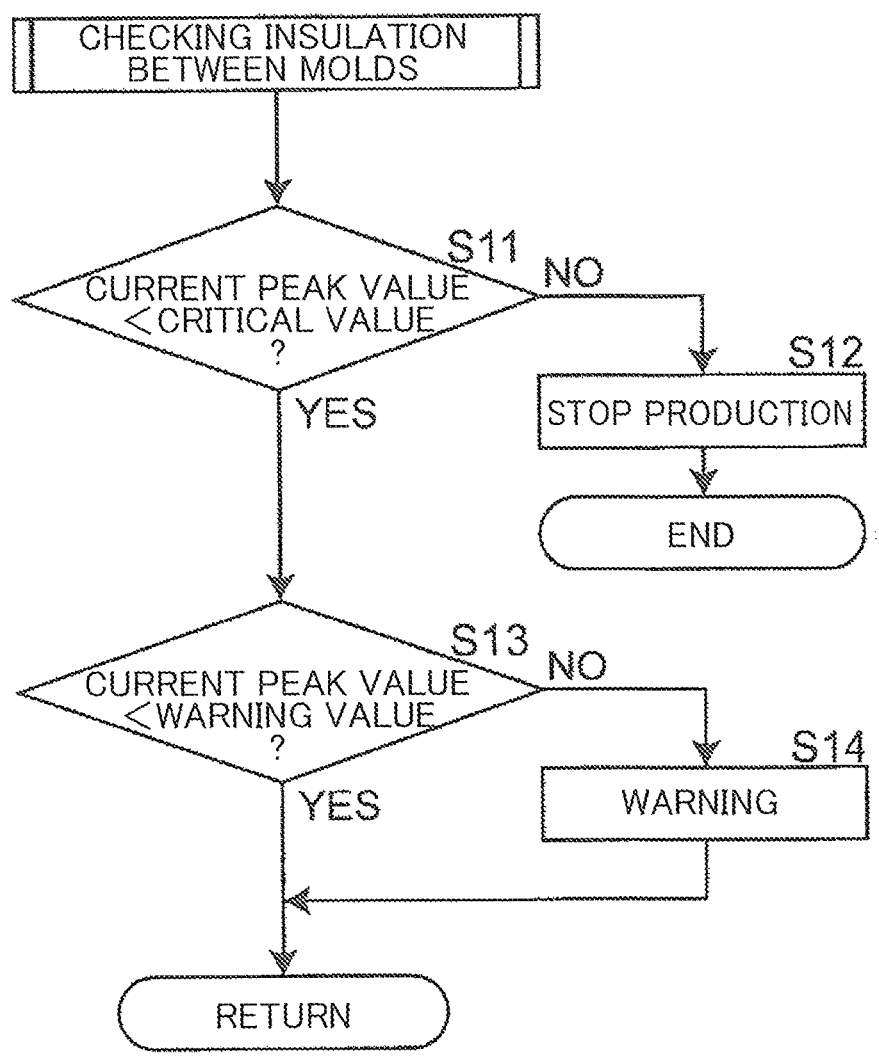
FIG. 5 is a flowchart showing a process of checking insulation between molds.
Figure 6:
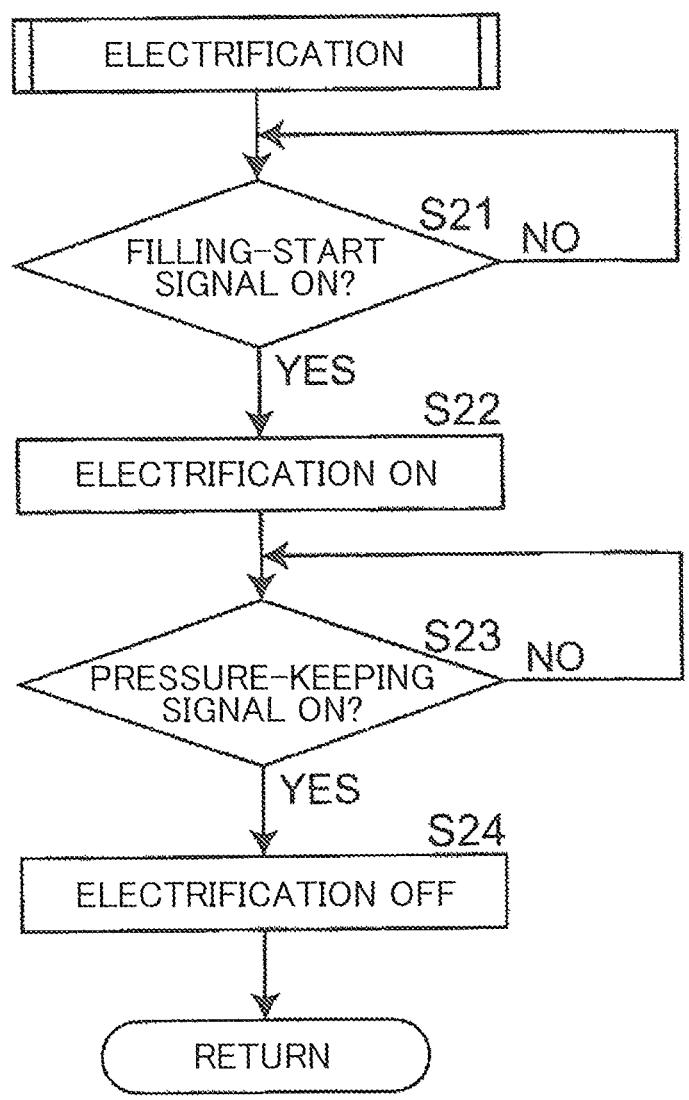
FIG. 6 is a flowchart showing an electrifying process.

A flow of control operations of the injection molding apparatus 1, which is controlled by the control unit 100, is described with reference to the flowcharts in FIGS. 4 to 6, and the time chart in FIG. 7. The time chart in FIG. 7 shows changes of a screwing position, an injection pressure, an electrification ON/OFF, and ON/OFF of the cooling pump 51 during the control operations of the injection molding apparatus 1.

The mold-clamping cylinder device 33 is driven at time t0 in response to a mold-clamping signal output from the mold-clamping controller 120. Accordingly, the movable mold 41 moves toward the fixed mold 42. As a result of the movement of the movable mold 41, the mold device 4 is closed and further clamped at a predetermined mold-clamping pressure (step S1). The mold-clamping pressure at this time is set to a high value at which the mold device 4 does not open at the injection. The cooling controller 130 stops driving the cooling pump 51 in response to a mold-clamping signal (performs switching from ON to OFF).

Insulation between molds (described later) of the mold device 4 is checked (step S2).

The injection controller 110 outputs an injection signal to the injection cylinder device 25 of the heating injection device 2 at time t1. The injection cylinder device 25 moves the screw 24 forward (rightward in FIG. 1) at a preset injection speed. Accordingly, injection of the molten conductive material P into the cavity C of the mold device 4 starts so that the cavity C is filled with the molten conductive material P (step S3).

The electrification controller 140 controls the electrification device 61 in response to the injection signal at the time t1. The electrification device 61 applies a predetermined voltage between the conductive portions 47, 48 under the control of the electrification controller 140. Accordingly, the conductive material P, which is filled in the cavity C and comes into contact with the conductive portions 47, 48, is electrically heated (step S4).

When the screw 24 then moves forward to a screw position A1, the cavity C is filled with the conductive material P completely. The screw 24 moves forward to the screw position A1 at time t2 shown in FIG. 7. At the time t2, the injection controller 110 outputs a pressure-keeping signal. The heating injection device 2 is controlled in response to the pressure-keeping signal. Accordingly, a pressure-keeping force P2 is applied to the conductive material P filled in the mold device 4 until a preset pressure-keeping period passes (step 5), the pressure-keeping force P2 being lower than a maximal pressure P1 applied at the time of the injection and filling.

At time t3 after the pressure-keeping period passes, the screw 24 moves forward to a screw position A2. A molded product is cooled during a preset cooling period from the time t3. Simultaneously, the heating injection device 2 uses the band heater 23 to heat the conductive material P to the molten temperature for the next shot. Accordingly, the conductive material P is heated and melted. The batching motor 26 rotates the screw 24. Consequently, the screw 24 moves backward to a predetermined position. Meanwhile, the material fed from the hopper 22 is heated and melted in the injection cylinder 21. The material fed from the hopper 22 is stored in front of the screw 24 in accordance with the backward movement of the screw 24 (step S6).

The mold-clamping controller 120 controls the mold-clamping device 3 at time t4 after the cooling period elapses to move the mold-clamping piston 33a of the mold-clamping cylinder device 33 backward. Accordingly, the mold-device 4 is opened (step S7).

The ejector then ejects the molded product from the cavity C of the mold device 4. Accordingly, the molded product is taken out (step S8).

Eventually, the control unit 100 determines whether or not the molding is finished. When the control unit 100 determines that the molding is finished, the injection molding cycle is finished (step S9).

The process of checking insulation between the molds as a subroutine of the step S2 is described with reference to FIG. 5.

As described above, the in-mold resistance value sensor 63 measures a leak current, which flows between the conductive portions 47, 48. The electrification controller 140 refers a peak value of the leak current to determine whether or not the peak value is lower than the preset critical value I3 (step S11).

When the peak value is determined not to be lower than the critical value I3 (NO in step S11), production of molded products by the injection molding apparatus 1 is stopped (step S12). An operator of the injection molding apparatus 1 may resume the production after the stop of the production and replacement of the mold device 4 with a new one.

When the peak value is determined to be lower than the critical value I3 (YES in step S11), the electrification controller 140 determines whether or not the peak value is lower than the preset warning value I2 (step S13).

When the peak value is determined not to be lower than the warning value I2 (NO in step S13), for example, the electrification controller 140 may cause an alarming sound from a buzzer (not shown) provided in the injection molding apparatus 1, turn on a warning lump (not shown) or flush a warning light. Accordingly, an operator of the injection molding apparatus 1 may be warned (step S14). The control flow then returns to the main routine of FIG. 4.

Figure 4:
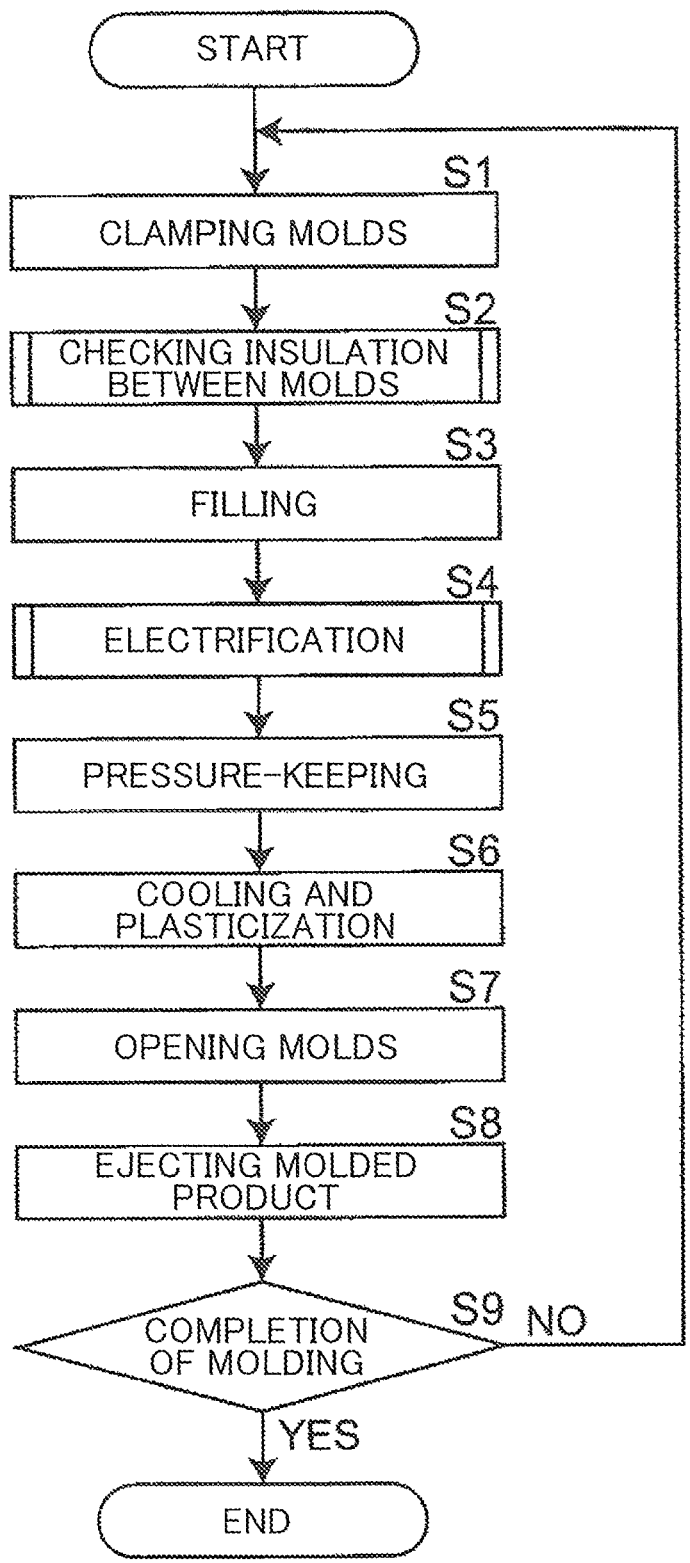
FIG. 4 is a flowchart showing an injection molding cycle.

When the peak value is determined to be lower than the warning value I2 (YES in step S13), the control flow returns to the main routine of FIG. 4.

The insulation between the movable and fixed molds 41, 42 is checked through the aforementioned subroutine.

An electrifying process as a subroutine of step S4 is described with reference to FIG. 6.

The electrification controller 140 determines whether or not the injection signal output from the injection controller 110 to the heating injection device 2 is ON (step S21).

When the electrification controller 140 determines that the injection signal is ON (YES in step S21), the electrification device 61 starts the electrification under the control of the electrification controller 140 (step S22).

The electrification controller 140 controls a voltage application from the electrification device 61 to the conductive portions 47, 48 so as to avoid a reduction in fluidity resultant from a temperature drop of the conductive material P moving in the cavity C. In the present embodiment, the electrification device 61 applies a preset constant voltage between the conductive portions 47, 48.

The electrification controller 140 then determines whether or not the pressure-keeping signal output from the injection controller 110 to the heating injection device 2 is ON (step S23).

When the electrification controller 140 determines that the pressure-keeping signal is ON (YES in step S23), the electrification device 61 ends the electrification. The control flow returns to the main routine of FIG. 4 (step S24).

The electrification device 61 is controlled through the aforementioned subroutine on the basis of an injection state of the conductive material P, the injection state being represented by a control signal output from the injection controller 110.

<Second Embodiment>

A configuration of a mold device 4 for an injection molding apparatus 1 according to the second embodiment is described with reference to FIGS. 8A to 10. The description about the first embodiment is applied to the same configuration as the first embodiment.

Figure 8A:
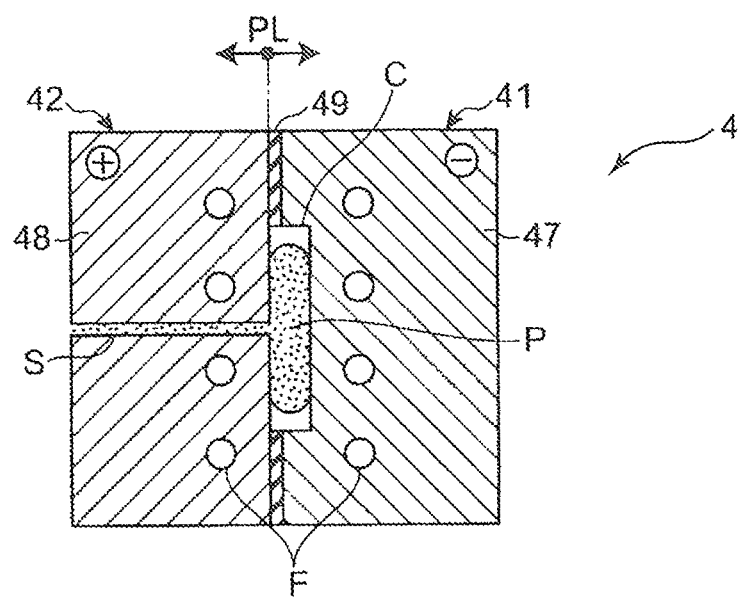
FIG. 8A is a cross sectional view showing a schematic structure of a mold device of an injection molding apparatus according to the second embodiment.

As shown in FIG. 8A, the mold device 4 of the injection molding apparatus 1 according to the second embodiment includes an insulator 49. The insulator 49 is situated between conductive portions 47, 48 which form a movable mold 41 and a fixed mold 42, respectively. However, there is no insulator outside the conductive portions 47, 48 to insulate an outer surface of the mold device 4 from the conductive portions 47, 48. Therefore, the outer surface of the mold device 4 is not electrically insulated from the conductive portions 47, 48.

If an electric shock on an operator can be prevented by other appropriate ways, the mold device 4 of the second embodiment without insulator to insulate the outer surface of the mold device 4 from the conductive portions 47, 48 is preferably used. Alternatively, if it is unnecessary to consider such a risk of the electric shock on the operator (e.g. if full automatic production by the injection molding apparatus 1 is realized), the mold device 4 of the second embodiment is preferably used.

According to the principle of the second embodiment, the mold device 4 may not have a complicated fit-in mode structure. Therefore, the mold device 4 may be easily fabricated at low cost.

<Third Embodiment>

Figure 8B:
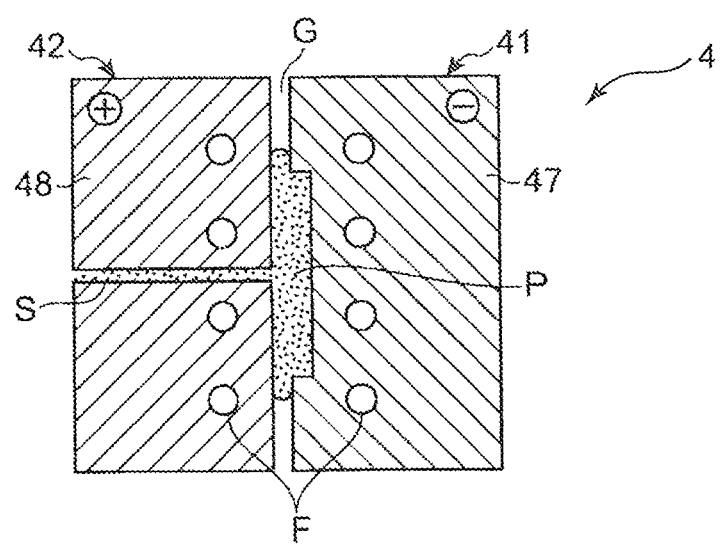
FIG. 8B is a cross sectional view showing a schematic structure of a mold device of an injection molding apparatus according to the third embodiment.

FIG. 8B shows a mold device 4 for an injection molding apparatus 1 according to the third embodiment. A conductive material P is injected between a movable mold 41 and a fixed mold 42 of the mold device 4, the conductive material being molded with a predetermined gap G between the movable and fixed molds 41, 42. When a molded product is formed with the use of the injection molding apparatus 1 according to the third embodiment, the conductive material P filled in a cavity C overflows to the gap G outside the cavity C, and is cooled and molded. The gap G is defined between the movable and fixed molds 41, 42. Therefore, a designer designing the mold device 4 does not have to arrange any insulator between the conductive portions 47, 48 which form the movable and fixed molds 41, 42 respectively in order to electrically insulate the conductive portions 47, 48 from each other. Like the second embodiment, there is no insulator outside the conductive portions 47, 48 to insulate the outer surface of the mold device 4 from the conductive portions 47, 48.

If an indefinite peripheral portion of the molded product which is overflown into the gap G can be cut into a desired shape in another process, the mold device 4 of the third embodiment is preferably used. Alternatively, if the molded product having an indefinite peripheral portion can be used as a product, the mold device 4 of the third embodiment is preferably used.

According to the principle of the third embodiment, the mold device 4 may not have any insulator between the conductive portions 47, 48. Therefore, the mold device 4 may be easily fabricated at low cost.

<Fourth Embodiment>

It is described with reference to FIG. 9A how to form insulators 45, 46 for a mold device 4.

Figure 9A:
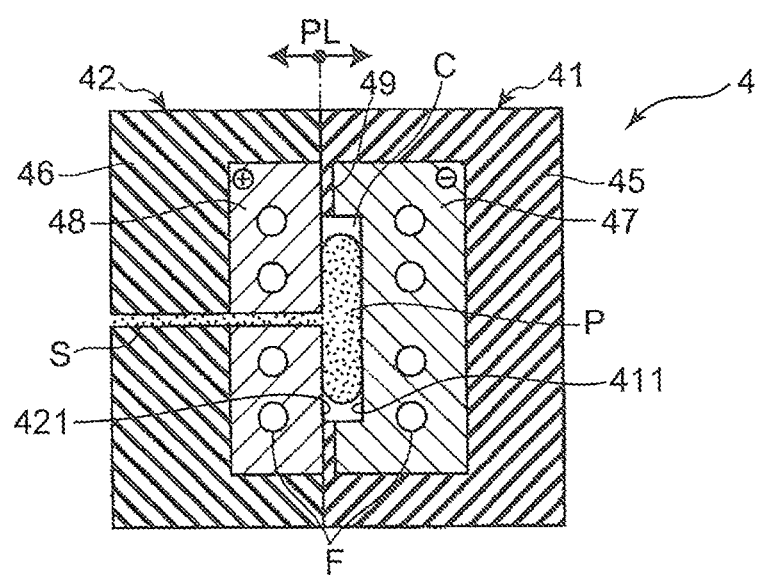
FIG. 9A is a cross sectional view showing a schematic structure of a mold device of an injection molding apparatus according to the fourth embodiment.

FIG. 9A shows a mold device 4 for an injection molding apparatus 1 according to the fourth embodiment. The circumference of the mold device 4 except cavity formation surfaces 411, 421 of conductive portions 47, 48 is coated by relatively thick insulators 45, 46. An insulating layer 49 insulates the conductive portions 47, 48 from each other. For example, the conductive portions 47, 48 are set in predetermined molds. The insulators 45, 46 are then formed by an insulating material such as ceramics, cement or the like filled and solidified in the molds.

According to the principle of the fourth embodiment, a designer may design the insulators 45, 46 to be relatively thick. There may be improved insulation of the outer surface of the mold device 4 from the conductive portions 47, 48. Therefore, an operator may safely work even under application of a high voltage between the conductive portions 47, 48.

<Fifth Embodiment>

Figure 9B:
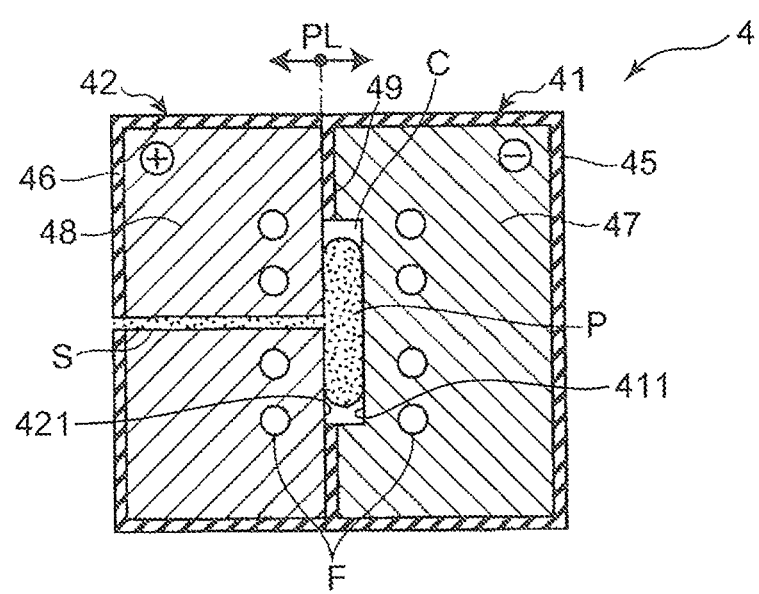
FIG. 9B is a cross sectional view showing a schematic structure of a mold device of an injection molding apparatus according to the fifth embodiment.

FIG. 9B shows a mold device 4 for an injection molding apparatus 1 according to the fifth embodiment. Relatively thin insulating layers 45, 46 are provided on circumferences of the conductive portions 47, 48 except cavity formation surfaces 411, 421. An insulating layer 49 insulates the conductive portions 47, 48 from each other.

The insulating layers 45, 46 of the fifth embodiment are formed by an insulating material such as resin or ceramics provided on outer surfaces of the conductive portions 47, 48. The insulating material may be provided on the outer surfaces of the conductive portions 47, 48 by various ways such as applying, thermal spraying and spraying.

According to the principle of the fifth embodiment, the insulating layers 45, 46 may be relatively easily formed at low cost.

<Sixth Embodiment>

Figure 9C:
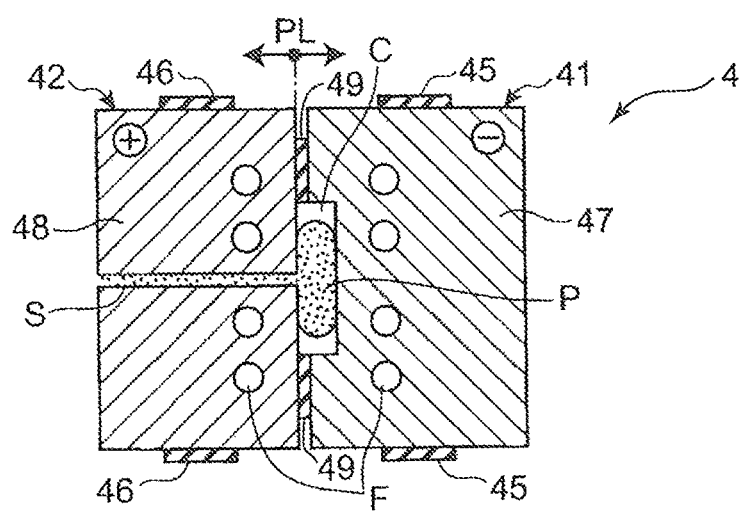
FIG. 9C is a cross sectional view showing a schematic structure of a mold device of an injection molding apparatus according to the sixth embodiment.

FIG. 9C shows a mold device 4 for an injection molding apparatus 1 according to the sixth embodiment. Each of insulating layers 45, 46, 49 is situated on a part of each circumference of the conductive portions 47, 48, and between the conductive portions 47, 48.

Each of the insulating layers 45, 46 of the sixth embodiment is formed by an insulator laminated on a part of each outer surface of the conductive portions 47, 48. The insulator may be made of tape-like or thin plate-like resin, ceramics or the like.

According to the principle of the sixth embodiment, the insulating layers 45, 46 may be relatively easily formed at low cost.

<Seventh Embodiment>

A local electrification to a conductive material P is described with reference to FIG. 10A.

Figure 10A:
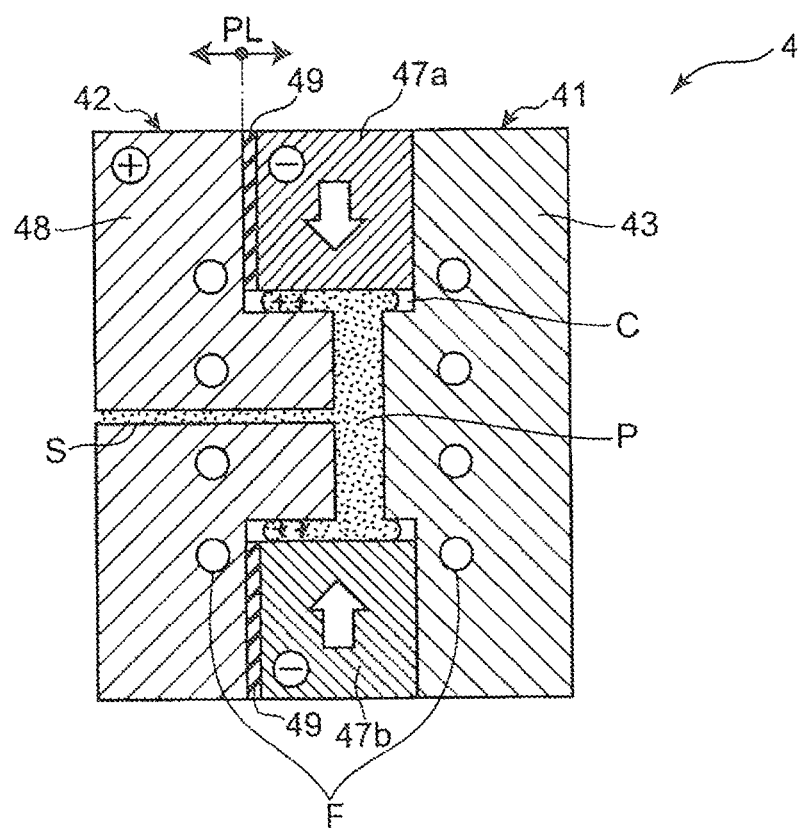
FIG. 10A is a cross sectional view showing a schematic structure of a mold device of an injection molding apparatus according to the seventh embodiment.

FIG. 10A shows a mold device 4 for an injection molding apparatus 1 according to the seventh embodiment. A movable mold 41 includes a center core 43 and slidable cores 47a, 47b. The center core 43 forms a mold shell. The slidable cores 47a, 47b are vertically slidable relatively to the center core 43. A fixed mold 42 is formed by a conductive portion 48. An insulating layer 49 is provided on each surface of the slidable cores 47a, 47b, the surface facing the conductive portion 48. An insulating layer to insulate the slidable cores 47a, 47b and the center core 43 from each other may be provided on one or both of the contact surfaces of the slidable cores 47a, 47b and the center core 43, the contact surfaces facing with each other.

According to the principle of the seventh embodiment, a part of the conductive material P filled in a cavity C is placed between the slidable core 47a and the conductive portion 48, and between the slidable core 47b and the conductive portion 48. When a voltage is applied between the slidable cores 47a, 47b and the conductive portion 48, the local electrification happens to a part of a conductive material P placed between the slidable core 47a and the conductive portion 48, and between the slidable core 47b and the conductive portion 48.

Accordingly, moldability is improved by the local electrification even if a distance of the cavity C between the slidable cores 47a, 47b and the center core 43 is too short for the conductive material to be filled in the cavity C.

<Eighth Embodiment>

Figure 10B:
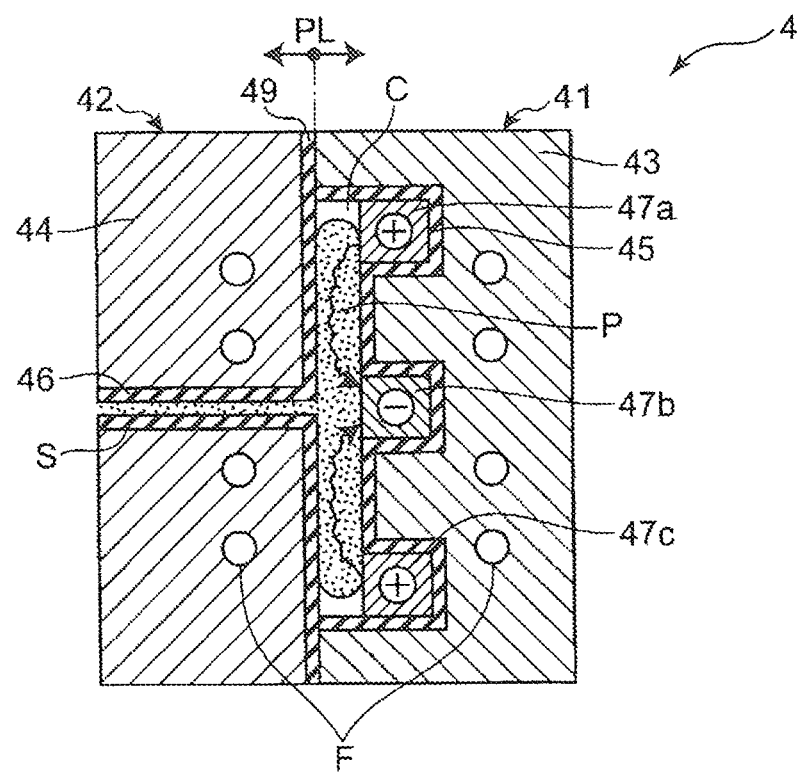
FIG. 10B is a cross sectional view showing a schematic structure of a mold device of an injection molding apparatus according to the eighth embodiment.

FIG. 10B shows a mold device 4 for an injection molding apparatus 1 according to the eighth embodiment. A movable mold 41 includes conductive portions 47a, 47b, 47c and a mold shell 43. The mold shell 43 surrounds the conductive portions 47a, 47b, 47c via an insulator 45. There is no conductive portion in the fixed mold 42. There is an insulator 49 on a surface which faces the movable mold 41 so that the insulator 49 prevents electric leakage toward a screw. There is an insulator 46 around a spool S.

According to the principle of the eighth embodiment, a current may flow in a filling direction in a conductive material P. Therefore, the electrification occurs at the relatively small conductive portions 47a, 47b, 47c. The conductive portions 47 are situated on both ends, at which it is difficult for the conductive material P to be filled. Therefore, the local electrification at both ends, at which it is difficult for the conductive material P to be filled, results in improved moldability.

<Ninth Embodiment>

Figure 11:
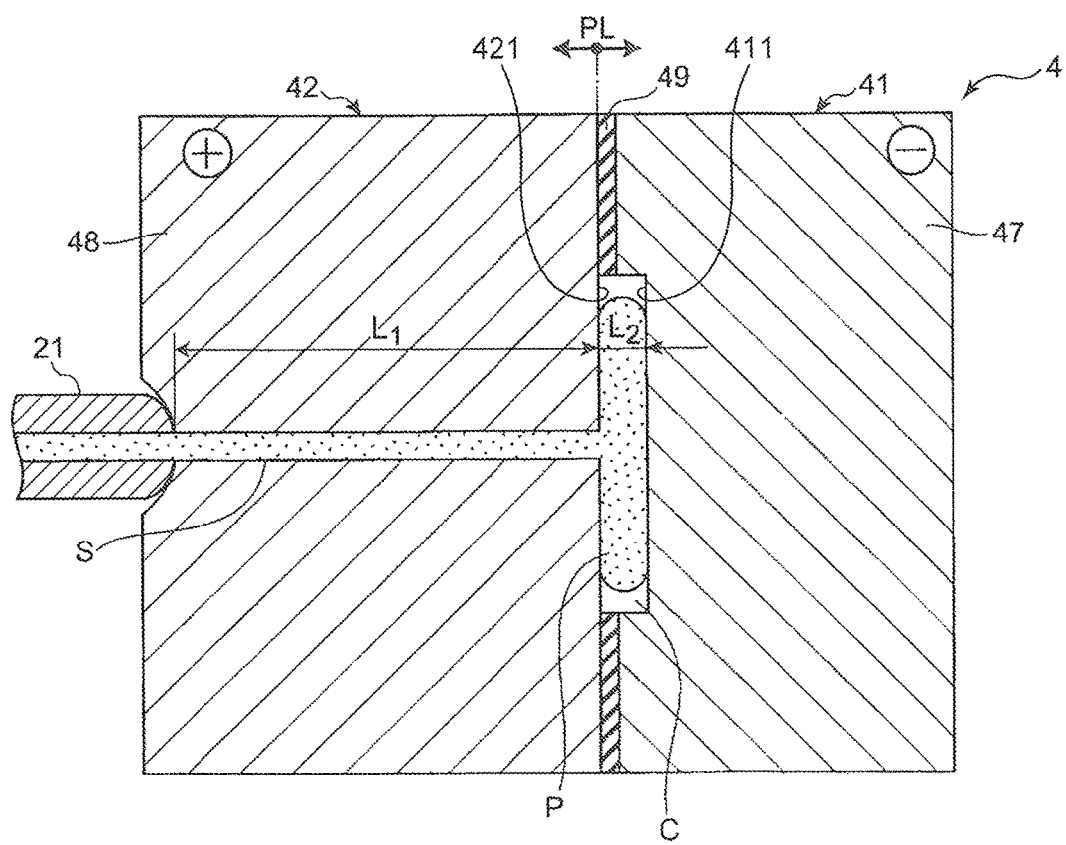
FIG. 11 is a cross sectional view showing geometry of a mold device (the ninth embodiment).

A structure of a mold device 4 for preventing electric leakage toward a screw is described with reference to FIG. 11. FIG. 11 shows a direct gate-type mold device 4 including a linear spool S.

The mold device 4 shown in FIG. 11 includes a movable mold 41 and a fixed mold 42. The movable and fixed molds 41, 42 include contact surfaces, respectively, which come into contact with each other when the mold device 4 is closed. Conductive portions 47, 48 are provided on cavity formation surfaces 411, 421 of the movable and fixed molds 41, 42, respectively. In order to prevent electric leakage toward the screw at the time of electrical heating, a spool length $L_1$ of the spool S of the mold device 4 is preferably larger than a cavity maximal distance $L_2$ of a cavity C that is the maximal distance between the conductive portions 47, 48.

When the cavity C is filled with a conductive material P, the conductive material P flows in a passage which defines the spool S in the fixed mold device 42. Meanwhile, a value of resistance against a current flowing in the conductive material P along the passage which defines the spool S becomes larger than a value of resistance against a current flowing in the depth direction of the cavity C when a voltage is applied between the conductive portions 47, 48. Therefore, the current flows to only the conductive material P filled in the cavity C when the voltage is applied between the conductive portions 47, 48. Accordingly, there is a low risk of current leak toward the screw via the conductive material P flowing in the passage which defines the spool S.

The spool S may be in a non-linear form, for example, a spiral form. The non-linear spool S has a spool length which is longer than that of the leaner spool S.

<Tenth Embodiment>

According to the principle of the aforementioned embodiment, a molten material filled in a cavity of a mold is electrically heated. However, if it takes a long time unnecessarily to electrically heat the molten material, a subsequent cooling period for a molded product also takes a long time. This means less efficient injection molding cycle. It is described in the tenth embodiment how to improve the efficiency of the injection molding cycle.

Figure 12:
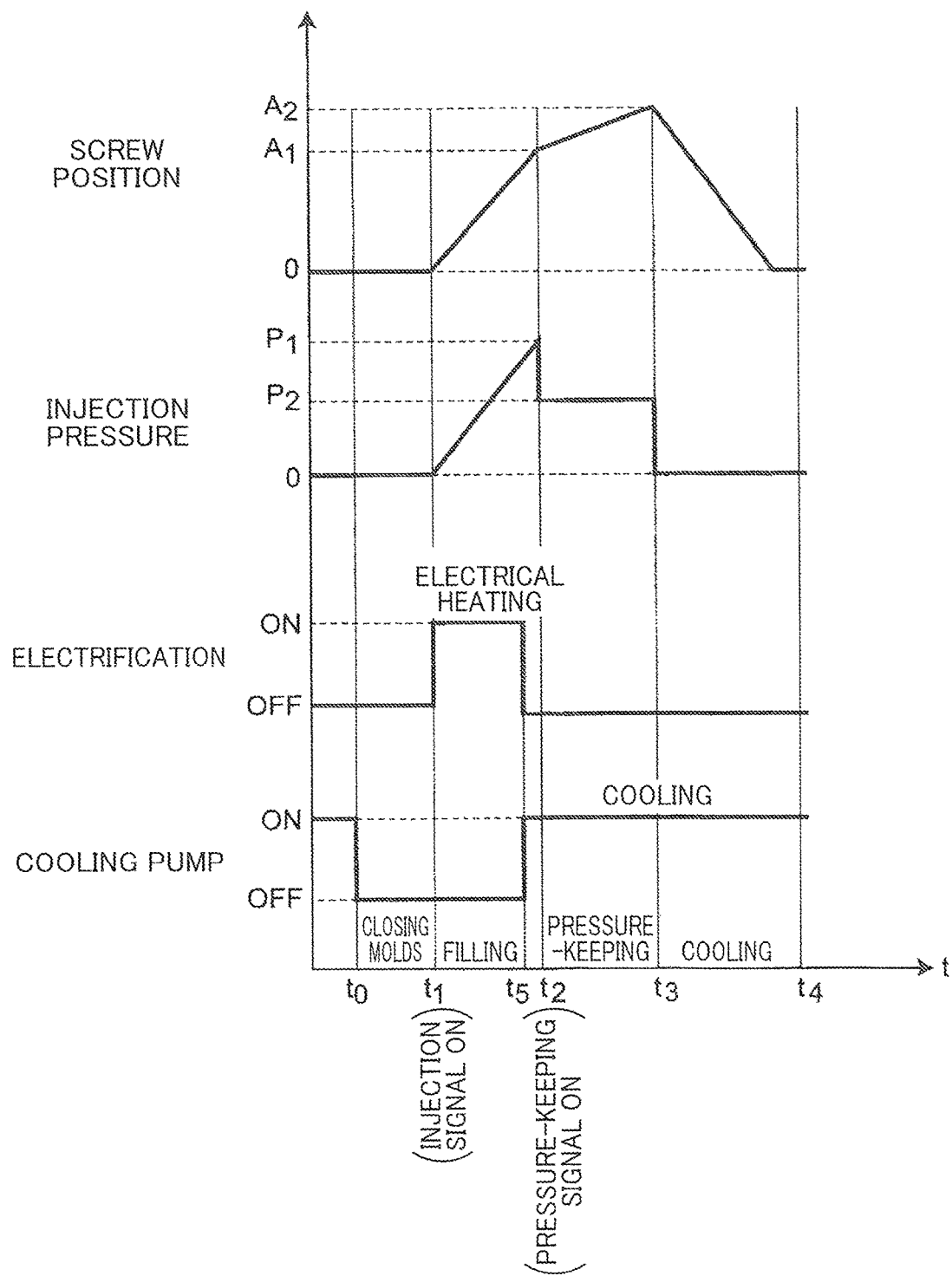
FIG. 12 is a time chart showing operations of an injection molding apparatus (the tenth embodiment).
Figure 13:
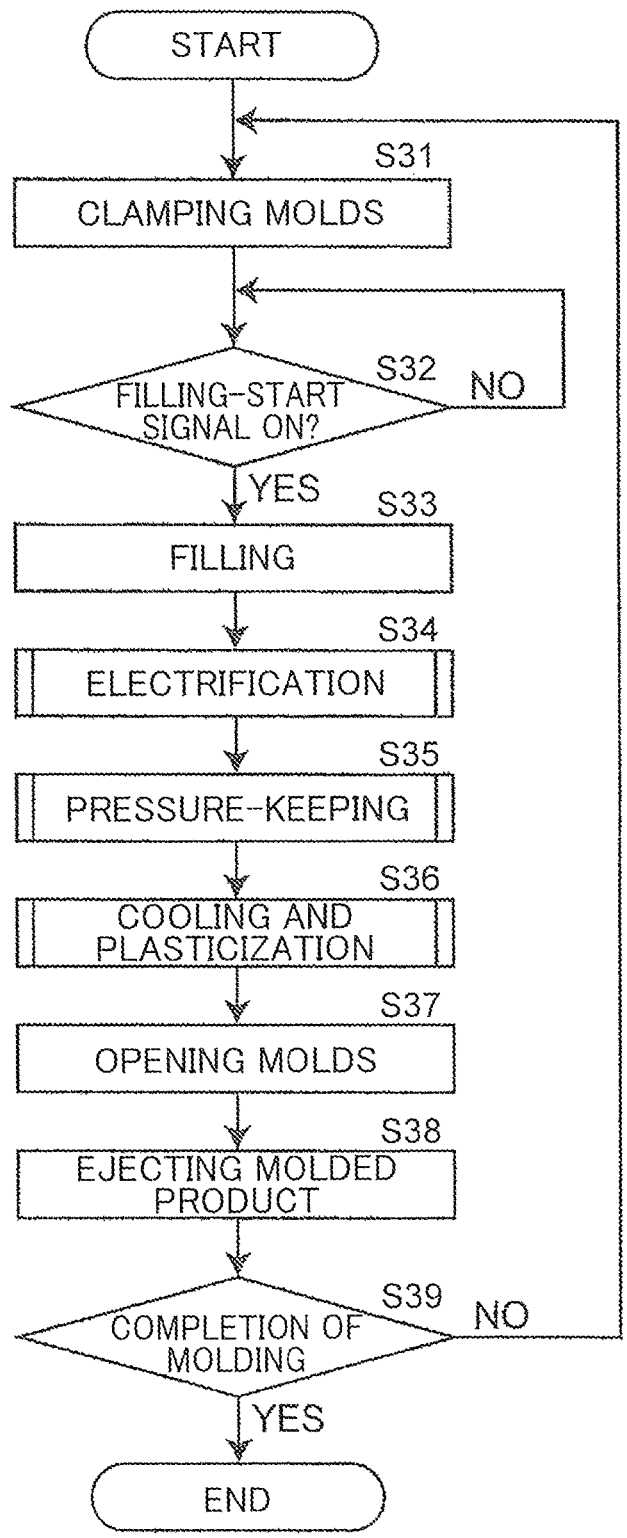
FIG. 13 is a flowchart showing an injection molding cycle (the eleventh embodiment).

FIG. 12 shows a time chart representing operations of the injection molding apparatus 1. The operations of the injection molding apparatus 1 are described with reference to FIGS. 1, 7 and 12.

The time chart in FIG. 12 is different from the time chart in FIG. 7 only in operations in the electrifying process and of the cooling pump 51. Therefore, the description about FIG. 7 is applied to the present embodiment except the operations in the electrifying process and of the cooling pump 51.

Like FIG. 7, FIG. 12 shows the times t0, t1, t2, t3, t4. The description about FIG. 7 is applied to the times t0, t1, t2, t3, t4. FIG. 12 further shows time t5. The time t5 is set between the times t1 and t2.

Like FIG. 7, FIG. 12 shows that electrification is started at the time t1. Unlike FIG. 7, FIG. 12 shows that the electrification is stopped at the time t5 before the time t2. In short, the voltage application between the conductive portions 47, 48 is stopped by the electrification controller 140 before the cavity is filled with a conductive material P completely.

The cooling pump 51 is driven at the time t5. In short, the driving the cooling pump 51 is substantially synchronized with the start of the electrification. The cooling by the cooling pump 51 continues from the time t5 to the time t4.

<Eleventh Embodiment>

According to the principle of the aforementioned embodiment, the molten material filled in the cavity of the mold is electrically heated. However, an electrical resistance value of a conductive material even containing the same components may vary between lots. The electrical resistance value of the conductive material may vary between shots even in the same lot. For example, such variations in the electric resistance value may cause unstable electrical heating for a conductive material. This may result in unstable quality of molded products between lots or shots. Fluidity may be drastically reduced under deficient electrical heating. In this case, there may be a high risk of molding defects such as short shot. If the electrical heating is too much, a gas generated from a molten material in the cavity may cause appearance defects in a molded product such as a burn (silver streak). Additionally, if the molded product is insufficiently cooled during the subsequent cooling process, the molded product may be deformed when the molded product is ejected from the mold device.

A mixture of a virgin material with regrind containing runners or defective molded products may be utilized in an ordinary molding process. Such utilization of the regrind contributes to resource saving and material cost reduction. However, impurities contained in the regrind are likely to cause large variations in an electrical resistance value than the virgin material. Therefore, the utilization of the regrind may be one of causes of unstable quality of molded products.

An operator operating the injection molding apparatus described with reference to the aforementioned embodiment may perform trial hits to set various process conditions for producing molded products before production start of the molded products. However, if a state of the conductive material changes too largely during the injection to be suitable for the set process conditions, there may be deterioration in quality of the molded products. It is described in the eleventh embodiment how to stabilize quality.

A flow of control operations of the injection molding apparatus 1, which is controlled by the control unit 100, is described with reference to the flow charts in FIGS. 13 to 16, the time chart in FIG. 17, and graphs in FIGS. 18A to 22. The time chart in FIG. 17 shows changes of a screw position, an injection pressure, electrification ON/OFF and a cooling pump 51 ON/OFF.

Like FIG. 7, FIG. 17 shows the times t0, t1, t2, t3, t4. The description of FIG. 7 is applied to the times t0, t1, t2, t3, t4. At the time t0, the mold-clamping cylinder device 33 is driven in response to a mold-clamping signal output from the mold-clamping controller 120. Accordingly, the movable mold 41 moves toward the fixed mold 42. As a result of the movement of the movable mold 41, the mold device 4 is closed so that the movable mold 41 is further clamped at a predetermined mold-clamping pressure (step 31). The mold-clamping pressure at this time is set to a high value at which the mold device 4 does not open at the injection. The cooling controller 130 stops driving the cooling pump 51 in response to the mold-clamping signal (perform switching from ON to OFF).

The control unit 100 then determines whether or not a filling-start signal output from the injection controller 110 to the heating injection device 2 is ON (step S32).

When the control unit 100 determines that the filling-start signal is ON (YES in step S32), the injection controller 110 outputs an injection signal to the injection cylinder device 25 of the heating injection device 2 at the time t1. The injection cylinder device 25 moves the screw 24 forward (rightward in the drawing) at a preset injection speed. Accordingly, injection molding of a molten conductive material P starts, the conductive material P flowing into the cavity C via the spool S of the mold device 4 from the nozzle at the tip of an injection cylinder 21 (step S33).

Figure 14:
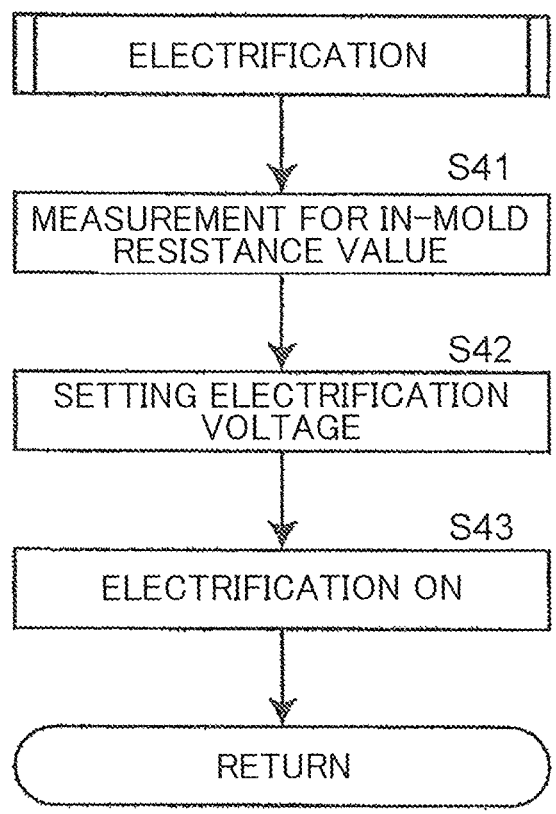
FIG. 14 is a flowchart showing an electrifying process in FIG. 13.

The electrification controller 140 then causes the electrification device 61 to start (ON) electrification in accordance with the subroutine shown in FIG. 14 (step S34).

Figure 15:
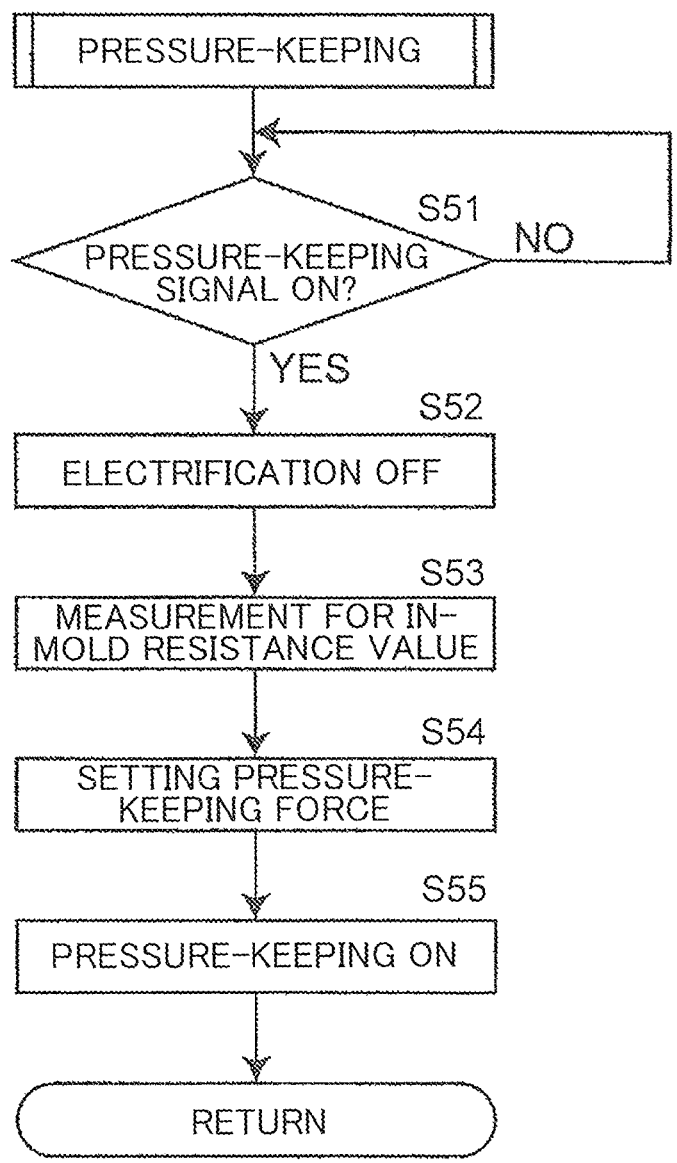
FIG. 15 is a flowchart showing a pressure-keeping process in FIG. 13.

At the time t2 after the electrification, the injection controller 110 causes the heating injection device 2 to start (ON) pressure-keeping in accordance with the subroutine shown in FIG. 15 (step S35).

Figure 16:
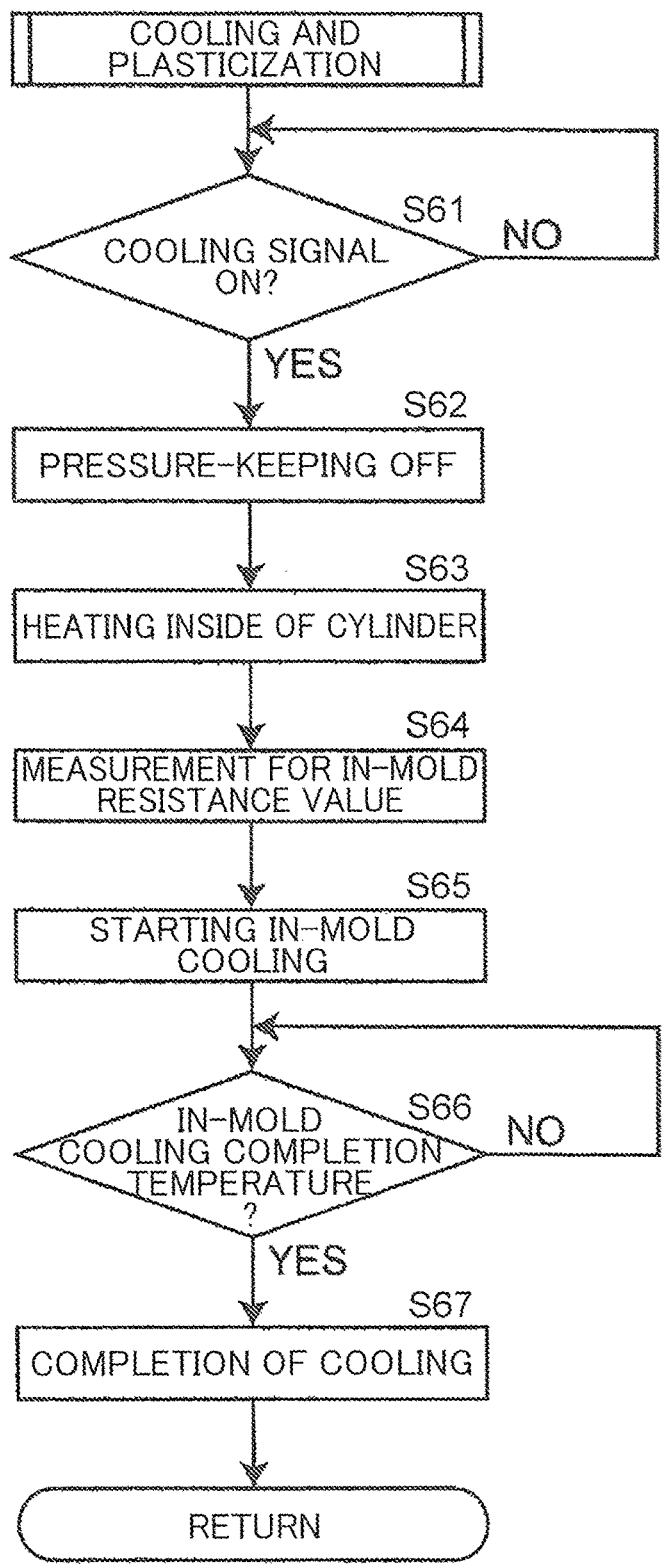
FIG. 16 is a flowchart showing a cooling and plasticizing process in FIG. 13.

At the time t3 after the pressure-keeping, the cooling controller 130 uses the cooling pump 51 to cool a molded product in accordance with the subroutine shown in FIG. 16. Additionally, the cooling controller 130 makes a material plasticized in the injection cylinder 21 (step S36).

At the time t4 after the plasticization, the mold-clamping controller 120 controls the mold-clamping device 3 to move the mold-clamping piston 33a of the mold-clamping cylinder device 33 backward. In short, the mold device 4 is opened (step S37).

The ejector then ejects the molded product from the cavity C of the mold device 4. Consequently, the molded product is taken out (step S38).

Eventually, the control unit 100 determines whether or not a preplanned molding is finished. When the control unit 100 determines that the molding is finished, the injection molding cycle is finished (step S39). When the control unit 100 determines that the molding is not finished, step S31 is executed.

The electrifying step as a subroutine of step S34 is described with reference to FIG. 14.

An in-mold resistance value sensor 63 measures an in-mold resistance value between the conductive portions 47, 48 (step S41).

As the cavity C is filled with the conductive material P, electricity flows between the conductive portions 47, 48 via the conductive material P. Accordingly, the in-mold resistance value between the conductive portions 47, 48 decreases as shown by the period from the time t1 to the time t2 in FIG. 17.

The electrification controller 140 then sets a voltage on the basis of the measured in-mold resistance value, the voltage being applied between the conductive portions 47, 48 from the electrification device 61 (step S42). The voltage set by the electrification controller 140 is determined so that a temperature drop of the conductive material P moving in the cavity C does not cause a reduction in fluidity.

Figure 18A:
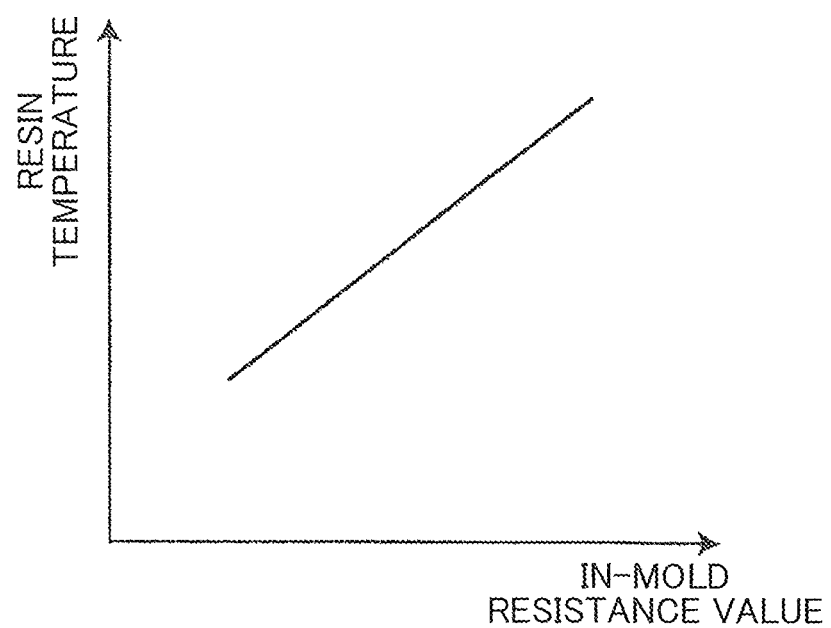
FIG. 18A is a graph showing a relationship between an in-mold resistance value and a resin temperature.

As shown in FIG. 18A, the in-mold resistance value is substantially proportional to a temperature of the conductive material P. As a resin temperature increases, the in-mold resistance value becomes higher.

Figure 18B:
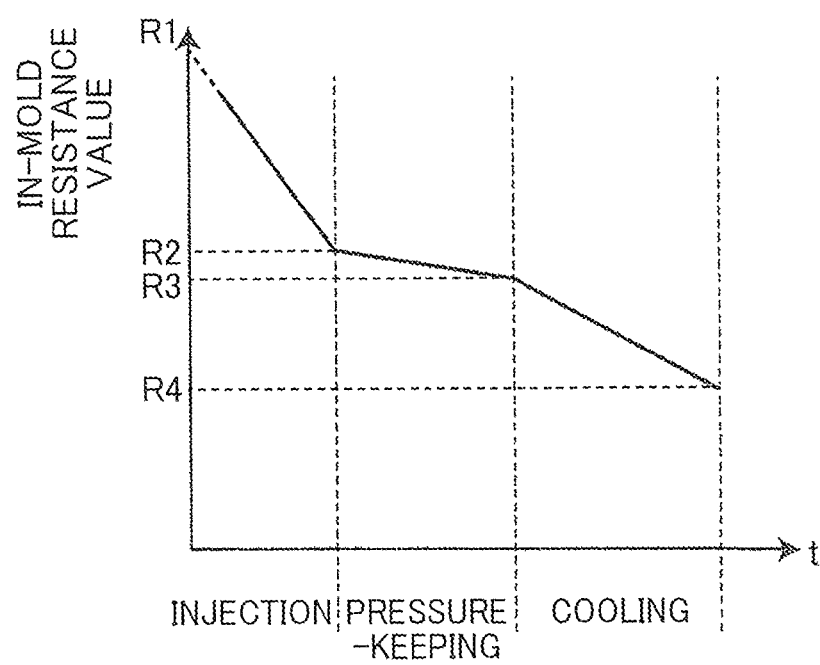
FIG. 18B is a graph showing an in-mold resistance value change in an injecting process, the pressure-keeping process and the cooling process.

As shown in FIG. 18B, the in-mold resistance value drastically decreases from R1 to R2 since a filing amount of the conductive material P increases in the injecting process of the injection molding cycle, the conductive material P allowing a current to flow between the conductive portions 47, 48. Since a temperature of the filled conductive material P gradually decreases in the pressure-keeping process, the in-mold resistance value gradually decreases from R2 to R3. The in-mold resistance value further decreases from R3 to R4 since the conductive material is cooled in the cooling process.

Figure 19A:
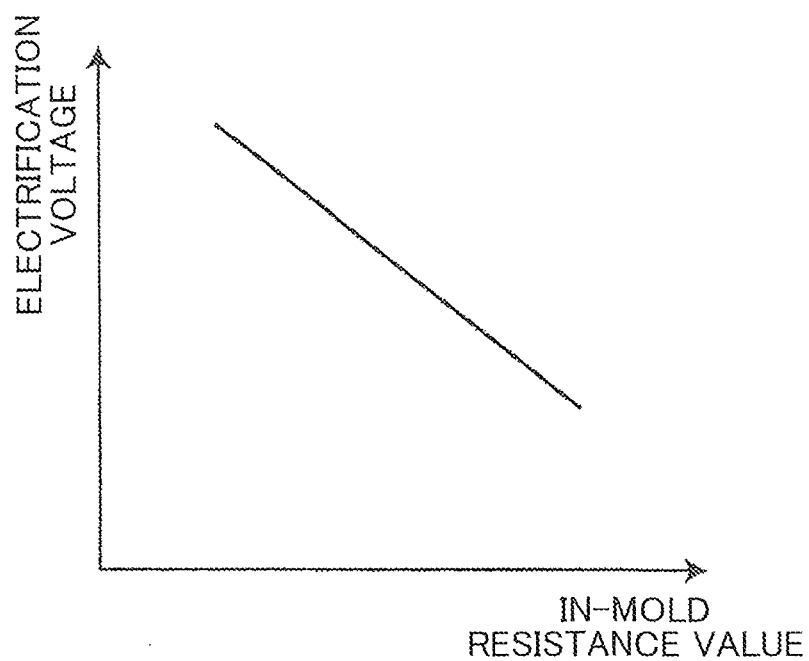
FIG. 19A is a graph showing a relationship between a resin temperature and an electrification voltage.

As shown in FIG. 19A, an electrification voltage between the conductive portions 47, 48 may be increased if the in-mold resistance value decreases. Accordingly, there is an increase in a current flowing to the conductive material P. There is an increase in Joule heat generated in the conductive material P. Accordingly, there is not a drastic temperature drop of the conductive material P moving in the cavity C.

The electrification controller 140 may keep a temperature of the conductive material P moving in the cavity C to be substantially constant in the injecting process in accordance with the aforementioned principle of the temperature-keeping. The electrification controller 140 sets an electrification voltage to be applied between the conductive portions 47, 48 on the basis of a difference value (R1–Rt) between an in-mold resistance value R1 measured in a state, which there is no injection of the conductive material into the mold, and an in-mold resistance value (Rt) (a period t1 to t2) measured in a state, which the conductive material is injected into the mold, or after injection of the conductive material into the mold. The electrification controller 140 controls the electrification device 61 to decrease the applied voltage when the in-mold resistance value Rt is higher than a predetermined threshold. The electrification controller 140 controls the electrification device 61 to increase the application voltage when the in-mold resistance value Rt is lower than the predetermined threshold.

Eventually, the electrification device 61 applies (ON) the set electrification voltage between the conductive portions 47, 48 (step S43). The control flow then returns to the main routine of FIG. 13. As shown in FIG. 19B, a temperature of the conductive material P moving in the cavity C is kept substantially constant in the injecting process.

According to the aforementioned subroutine, the electrifying process is controlled on the basis of the in-mold resistance value between the conductive portions 47, 48.

The pressure-keeping process as a subroutine of step S35 is described with reference to FIG. 15.

The electrification controller 140 determines whether or not a pressure-keeping signal output from the injection controller 110 to the heating injection device is ON (step S51).

When the electrification controller 140 determines that the pressure-keeping signal is ON (YES in step S51), the electrification by the electrification device 61 ends (OFF) (step S52).

The in-mold resistance value sensor 63 then measures a in-mold resistance value between the conductive portions 47, 48 (step S53).

Figure 20:
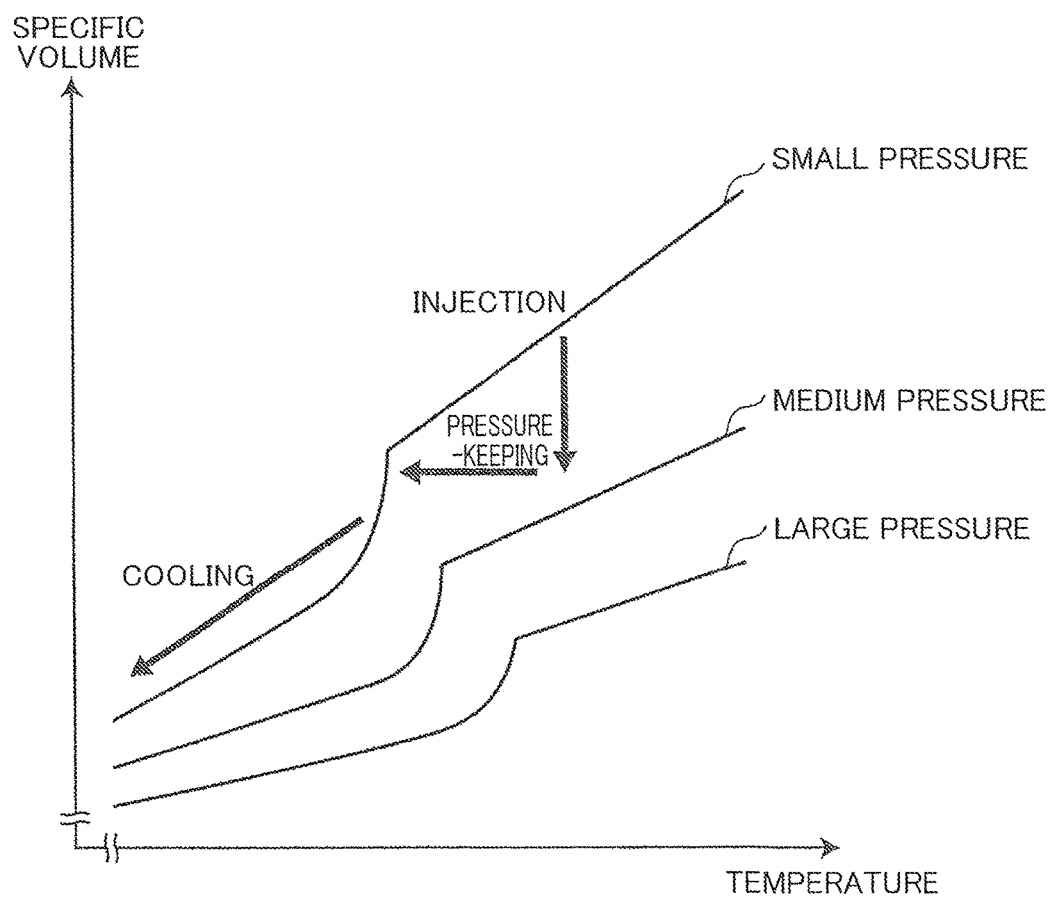
FIG. 20 is a PVT diagram showing PVT characteristics of a conductive material.

The conductive material P has PVT characteristics shown in FIG. 20 as a mutual relationship among a pressure, a specific volume and a temperature. The specific volume relies on both the voltage and the temperature. As a temperature decreases, the specific volume decreases under a condition that the pressure is constant. As a pressure decreases, the specific volume increases under a condition that the temperature is constant. The pressure of the conductive material P increases in the injecting process of the injection molding cycle whereas the temperature of the conductive material P is substantially constant. The specific volume of the conductive material P is controlled to be substantially constant in the pressure-keeping process whereas the temperature of the conductive material P decreases. The temperature of the conductive material P decreases in the cooling process whereas the pressure of the conductive material P is substantially constant.

Figure 21A:
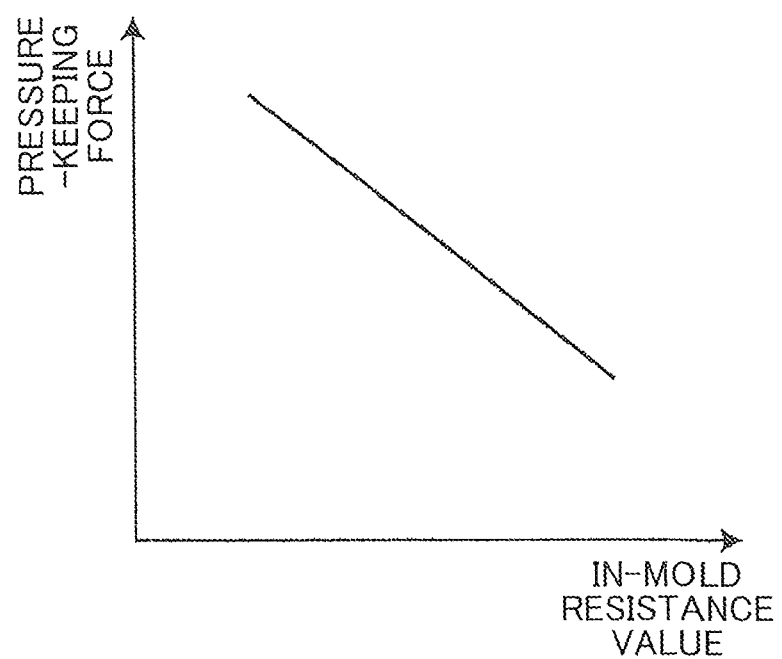
FIG. 21A is a graph showing a relationship between an in-mold resistance value and a pressure-keeping force.
Figure 21B:
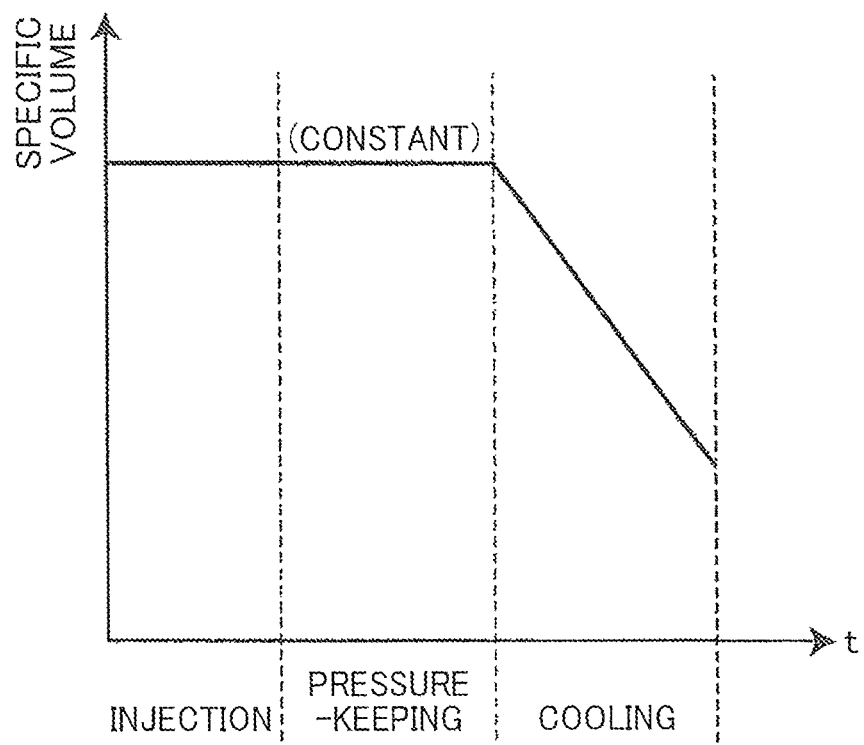
FIG. 21B is a graph showing a specific volume change in the injecting process, the pressure-keeping process and the cooling process.

As shown in FIG. 21A, the temperature of the conductive material P filled in the cavity C decreases when the in-mold resistance value decreases. Therefore, the volume of the conductive material P decreases. Meanwhile, the specific volume of the conductive material P filled in the cavity is less likely to drastically decrease when the pressure-keeping force increases.

The injection controller 110 may keep the specific volume of the conductive material P in the cavity C to be substantially constant in a predetermined range in accordance with the aforementioned principle of the specific volume keeping. The injection controller 110 sets the pressure-keeping force on the basis of a difference value (R1–Rt) between the in-mold resistance value R1 measured in a state, in which there is no injection of the conductive material into the mold, and the in-mold resistance value Rt (the times t2 to t3) measured in a state after injection of the conductive material into the mold (step S54). The pressure-keeping force shown in FIG. 17 is set to a constant value P2 in the pressure-keeping process. The injection controller 110 controls the heating injection device 2 to decrease a pressure-keeping force when the in-mold resistance value Rt is higher than a predetermined threshold. The injection controller 110 controls the heating injection device 2 to increase the pressure-keeping force when the in-mold resistance value Rt is lower than the predetermined threshold.

Eventually, the injection controller 110 controls the heating injection device 2 to start (ON) keeping a pressure at the set pressure-keeping force (step S55). The control flow returns to the main routine of FIG. 13.

According to the aforementioned subroutine, the pressure-keeping process is controlled on the basis of the in-mold resistance value between the conductive portions 47, 48.

The cooling and plasticizing process as a subroutine of step S36 is described with reference to FIG. 16.

The injection controller 110 determines whether or not the cooling signal to be output from the cooling controller 130 to the cooling pump 51 is ON (step S61).

When the injection controller 110 determines that the cooling signal is ON (YES in step S61), the heating injection device 2 ends (OFF) the pressure-keeping (step S62).

The heating injection device 2 then uses the band heater 23 to heat and melt the conductive material P to the molten temperature for the next shot. The batching motor 26 rotates the screw 24 to move the screw 24 backward to a predetermined position. Meanwhile, the material fed from the hopper 22 is heated and melted in the injection cylinder 21. The material fed from the hopper 22 is stored in front of the screw 24 in accordance with the backward movement of the screw 24 (step S63).

The in-mold resistance value sensor 63 then measures an in-mold resistance value (step S64).

The cooling controller 130 then uses the cooling pump 51 to start cooling the inside of the mold (step S65).

The cooling controller 130 then calculates a temperature of the conductive material P in the mold from the measured in-mold resistance value and the graph shown in FIG. 18A. The control unit 100 determines whether or not the calculated temperature reaches a target in-mold cooling completion temperature (c.f. step S66).

Eventually, the cooling controller 130 controls the cooling device 5 to end cooling the inside of the mold (step S67) when it is determined that the calculated temperature is not higher than the in-mold cooling completion temperature in step S66. The control flow returns to the main routine of FIG. 13. In the present embodiment, the predetermined threshold is exemplified by the in-mold cooling completion temperature.

According to the aforementioned subroutine, the cooling process is controlled on the basis of the in-mold resistance value between the conductive portions 47, 48.

<Twelfth Embodiment>

The variations in the electrical resistance described in the context of the eleventh embodiment may be influential to the injecting process, the pressure-keeping process and the cooling process. Techniques to make the variations in the electrical resistance value less influential to the injecting process, the pressure-keeping process and the cooling process are described in the twelfth embodiment.

A flow of control operations of the injection molding apparatus 1 controlled by the control unit 100 is described with reference to the flow charts in FIGS. 23 to 27, the time chart in FIG. 17 and the graphs in FIGS. 19B, 20, 21B, 22, and 28 to 32.

The mold-clamping cylinder device 33 is driven at the time t0 in response to an in-mold clamping signal output from the mold-clamping controller 120. Accordingly, the movable mold 41 moves toward the fixed mold 42. As a result of the movement of the movable mold 41, the mold device 4 is closed and further clamped at a predetermined mold-clamping pressure (step S71). The mold-clamping pressure at this time is set to a high value so that the mold device 4 does not open at the injection. The cooling controller 130 stops driving the cooling pump 51 in response to a mold-clamping signal (performs switching from ON to OFF).

The resistance sensor 62 then measures a volume resistance value of the conductive material P every shot, the conductive material P being heated and melted in the injection cylinder 21 (step S72). In the present embodiment, the measuring portion is exemplified by the resistance sensor 62. The parameter value is exemplified by the volume resistance value.

The control unit 100 then determines whether or not a filling-start signal output from the injection controller 110 to the heating injection device 2 is ON (step S73).

Figure 24:
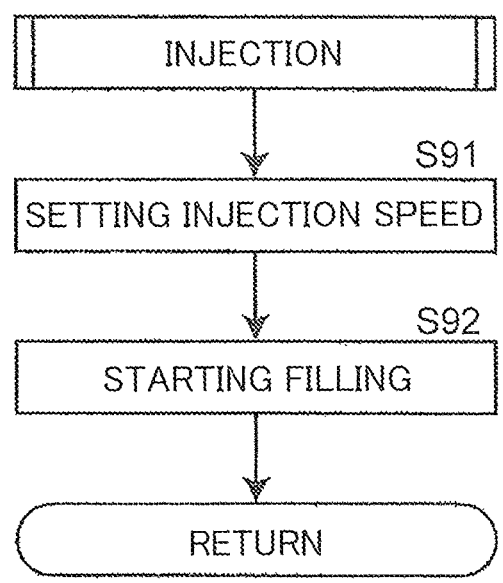
FIG. 24 is a flowchart showing an injecting process in FIG. 23.

When the control unit 100 determines that the filling-start signal is ON (YES in step S72), the heating injection device 2 stops the injection at the time t1 under the control of the injection controller 110 in accordance with the subroutine shown in FIG. 24 (step S74).

Figure 25:
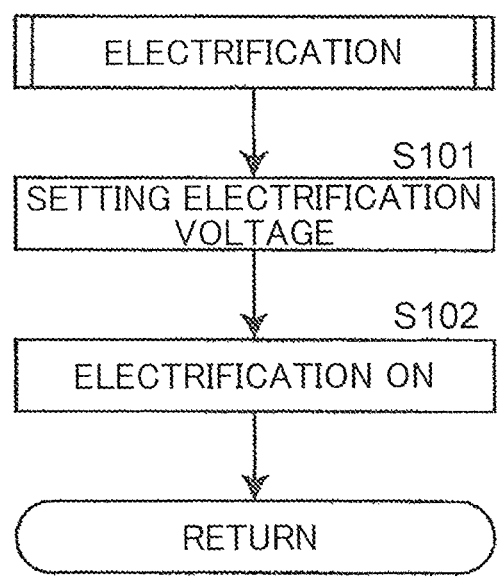
FIG. 25 is a flowchart showing an electrifying process in FIG. 23.

The electrification controller 140 causes the electrification device 61 to start (ON) electrification in accordance with the subroutine shown in FIG. 25 (step S75).

Figure 26:
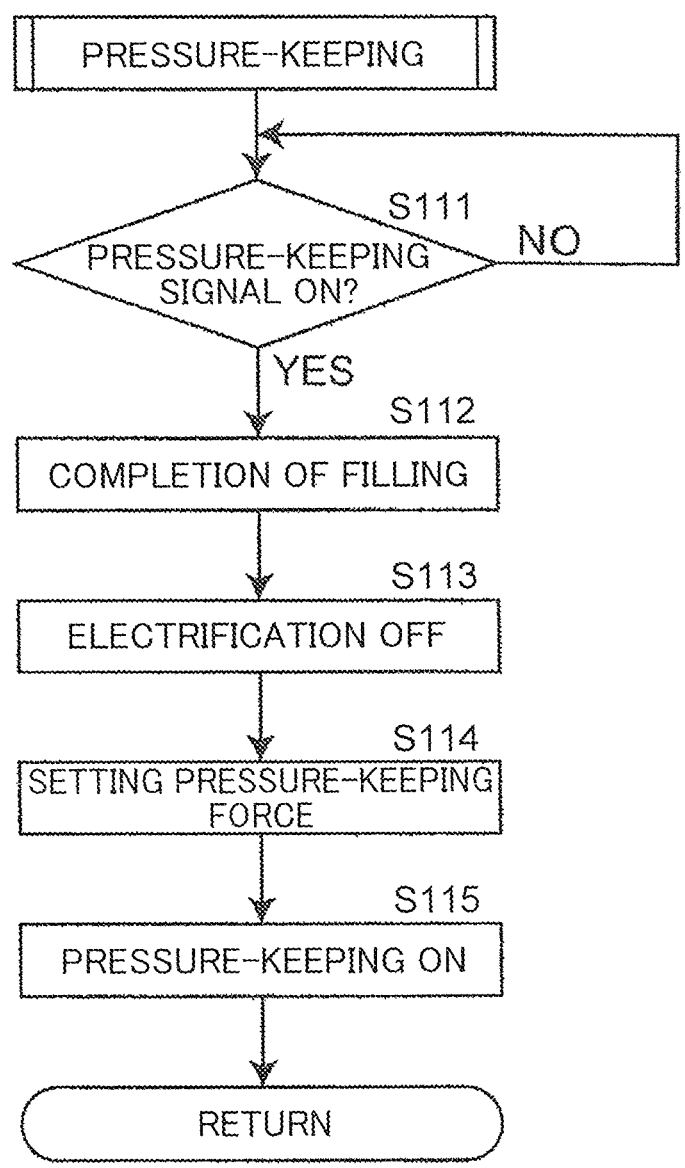
FIG. 26 is a flowchart showing a pressure-keeping process in FIG. 23.

At the time t2, the injection controller 110 causes the heating injection device 2 to start (ON) the pressure-keeping in accordance with the subroutine shown in FIG. 26 (step S76).

Figure 27:
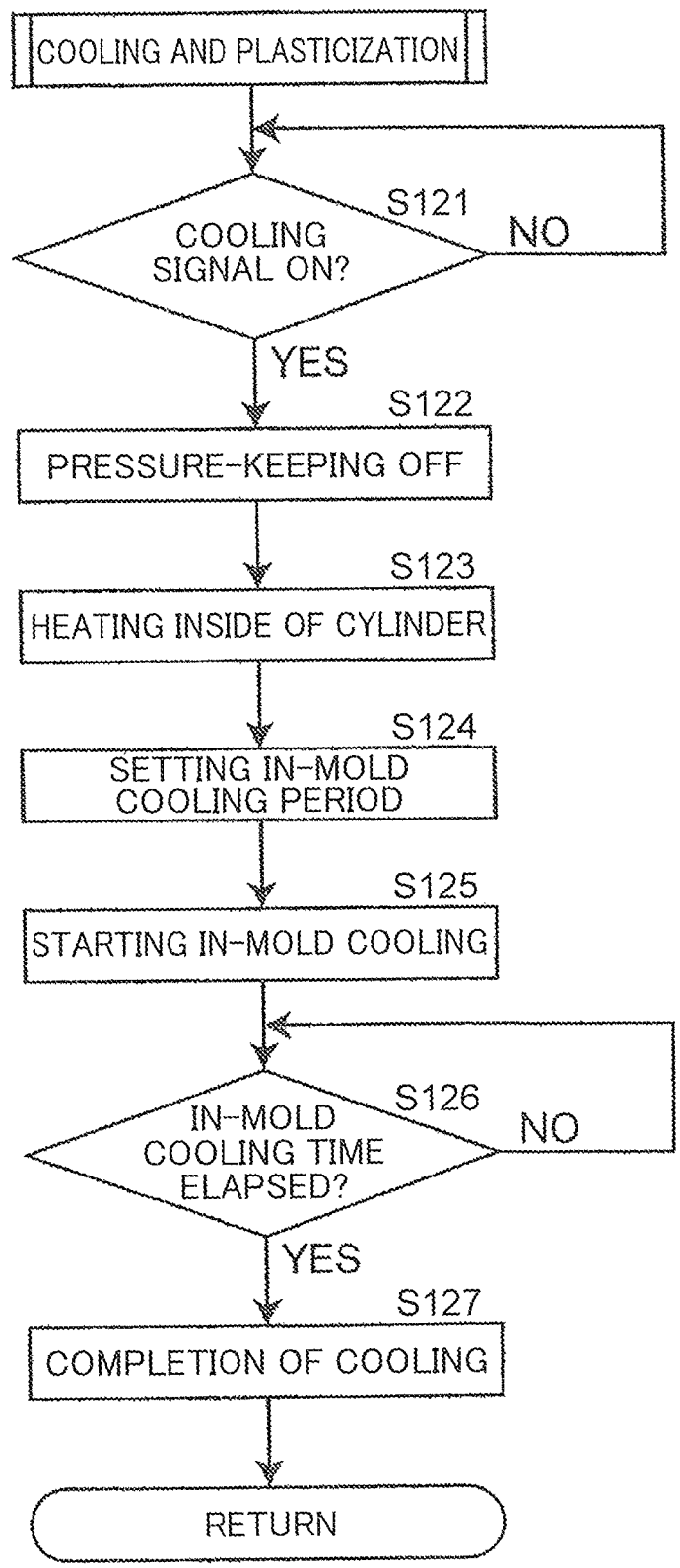
FIG. 27 is a flowchart showing a cooling process in FIG. 23.

At the time t3, the cooling controller 130 controls the cooling pump 51 to cool a molded product in accordance with the subroutine shown in FIG. 27. Consequently, the material in the injection cylinder 21 is plasticized (step S77).

At the time t4, the mold-clamping controller 120 controls the mold-clamping device 3 to move a mold-clamping piston 33a of the mold-clamping cylinder device 33 backward. Consequently, the mold device 4 is opened (step S78).

The ejector then ejects the molded product from the cavity C of the mold device 4. Consequently, the molded product is taken out (step S79).

The control unit 100 eventually determines whether or not a preplanned molding is finished. When the control unit 100 determines that the molding is finished, the control unit 100 ends the injection molding cycle (step S80). When the control unit 100 determines that the molding does not end, the control flow returns to step S71.

The injecting process as a subroutine of step S74 is described with reference to FIG. 24.

The injection controller 110 sets an injection speed (or injection pressure) of the conductive material P molten by the injection cylinder device 25 on the basis of measured volume resistivity.

The injection cylinder device 25 of the heating injection device 2 moves the screw 24 forward (rightward in the drawing) at the set injection speed. Filling the conductive material P molten into the cavity C is started from the nozzle at the tip of the injection cylinder 21 via the spool S of the mold device 4.

According to the aforementioned subroutine, the injecting process is controlled on the basis of the volume resistivity of the conductive material P.

The electrifying process as a subroutine of step S75 is described with reference to FIG. 25.

The electrification controller 140 sets a voltage to be applied between conductive portions 47, 48 from the electrification device 61 on the basis of measured volume resistivity (step S101). The voltage is determined so that a temperature drop of the conductive material P moving in the cavity C does not cause a reduction in fluidity.

Figure 28:
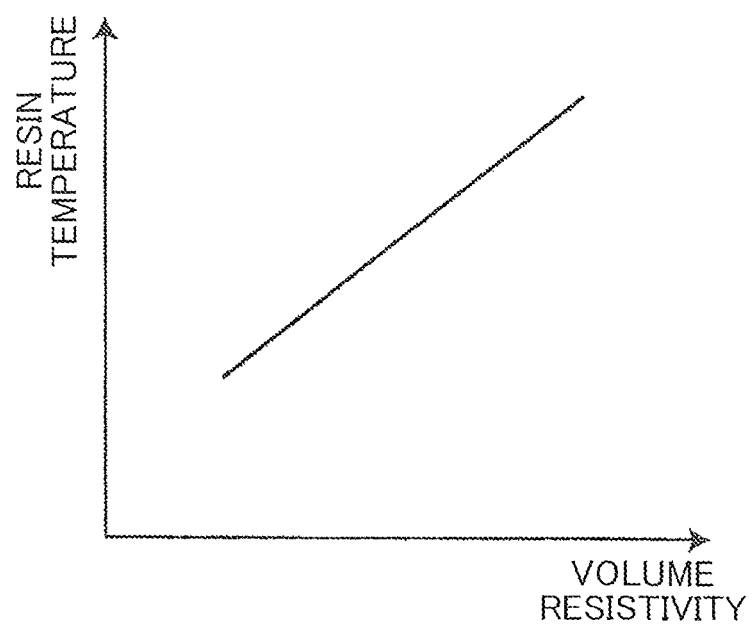
FIG. 28 is a graph showing a relationship between volume resistivity and a resin temperature.

As shown in FIG. 28, the volume resistivity is substantially proportional to a temperature of the conductive material P. As a resin temperature increases, the volume resistivity becomes higher.

Figure 29:
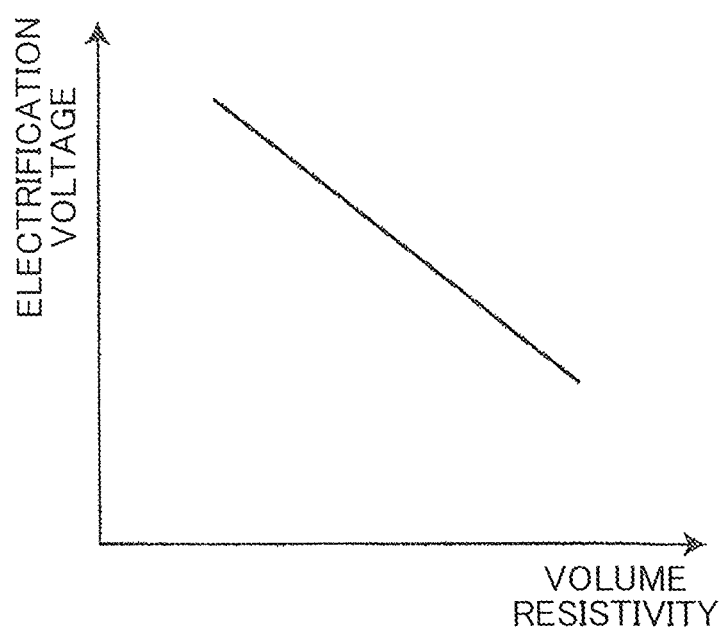
FIG. 29 is a graph showing a relationship between volume resistivity and an electrification voltage.

As shown in FIG. 29, an electrification voltage between the conductive portions 47, 48 is increased if there is a low in-mold resistance value which is measured in a shot. There is an increase in a current flowing to the conductive material P. Therefore, there is an increase in Joule heat generated in the conductive material P. Consequently, a temperature drop is less likely to happen to the conductive material P moving in the cavity C.

In accordance with the aforementioned temperature-keeping, the electrification controller 140 sets an electrification voltage to be applied between the conductive portions 47, 48 on the basis of the volume resistivity of the conductive material P, which is heated and melted in the injection cylinder 21. The electrification controller 140 controls the electrification device 61 to decrease the electrification voltage to be applied between the conductive portions 47, 48 when the volume resistivity is higher than a predetermined threshold. The electrification controller 140 controls the electrification device 61 to increase the electrification voltage to be applied between the conductive portions 47, 48 when the volume resistivity is lower than the predetermined threshold. Consequently, the temperature of the conductive material P moving in the cavity C is kept substantially constant between shots or lots in the injecting process.

Figure 30A:
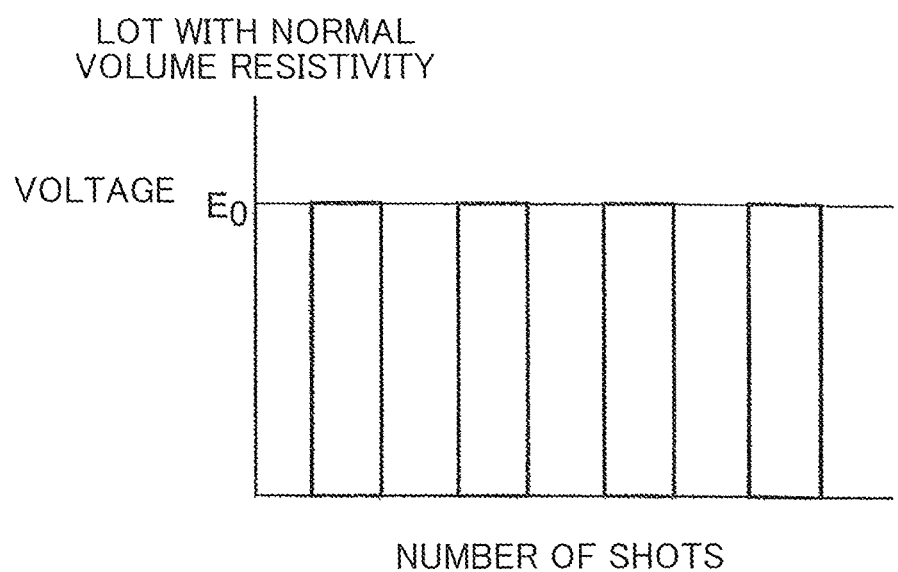
FIG. 30A is a graph showing a lot-to-lot variation in volume resistivity of a conductive material.

As shown in FIG. 30A, the voltage to be applied between the conductive portions 47, 48 from the electrification device 61 is set to E0 in a lot in which the volume resistivity of the conductive material P is kept constant at a normal value irrelevantly to the number of shots.

Figure 30B:
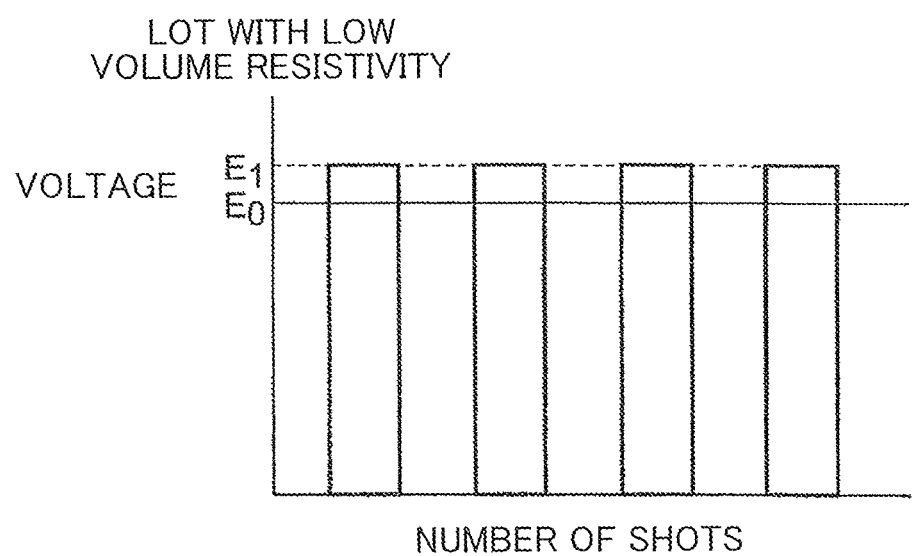
FIG. 30B is a graph showing a lot-to-lot variation in volume resistivity of the conductive material.
Figure 30C:
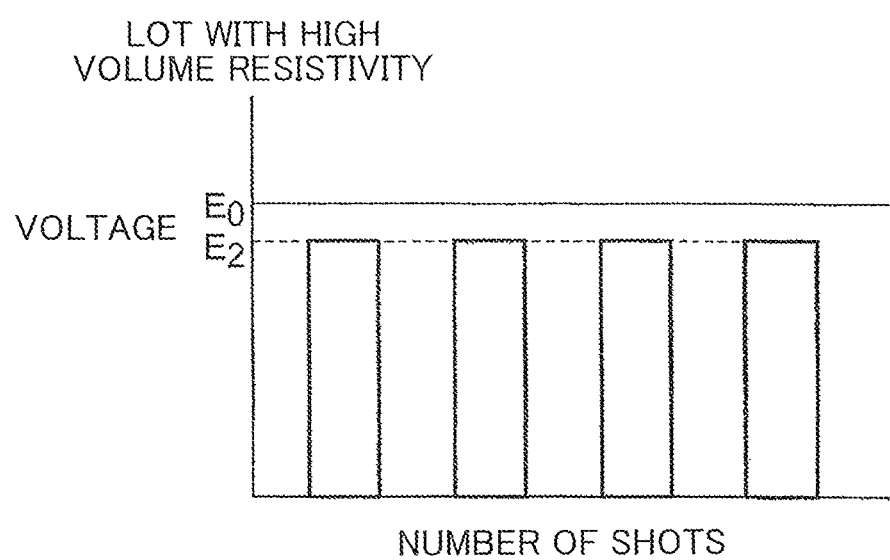
FIG. 30C is a graph showing a lot-to-lot variation in volume resistivity of the conductive material.

FIG. 30B shows a voltage set for a lot in which the volume resistivity of the conductive material P is kept constant at a value that is higher than a normal value irrelevantly to the number of shots. Voltage E1 which is higher than the voltage E0 is set as the voltage to be applied between the conductive portions 47, 48 so that a temperature of the conductive material P electrically heated in the cavity is equivalent to the temperature in the lot shown in FIG. 30A.

FIG. 30B shows a voltage set for a lot in which the volume resistivity of the conductive material P is kept constant at a lower value than the normal value irrelevantly the number of shots. Voltage E2 lower than the voltage E0 is set as the voltage to be applied between the conductive portions 47, 48 so that a temperature of the conductive material P electrically heated in the cavity is equivalent to the temperature in the lot shown in FIG. 30A.

Figure 31:
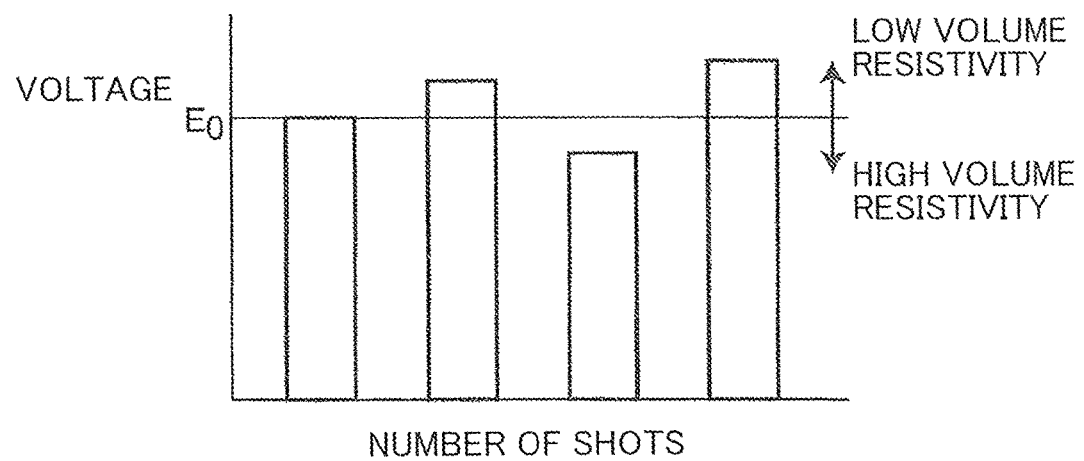
FIG. 31 is a graph showing a lot-to-lot variation in volume resistivity of the conductive material.

FIG. 31 shows a voltage set for a lot in which the volume resistivity of the conductive material P varies with respect to the normal value every shot. A voltage in correspondence to the volume resistivity is set every shot as the voltage to be applied between the conductive portions 47, 48 so that a temperature of the conductive material P electrically heated in the cavity is equivalent to the temperature in the lot shown in FIG. 30A.

The set electrification voltage is eventually applied (ON) between the conductive portions 47, 48 from the electrification device 61 (step S102). The control flow returns to the main routine of FIG. 23. As shown in FIG. 19B, a temperature of the conductive material P moving in the cavity C is kept substantially constant between shots or lots in the injecting process.

According to the aforementioned subroutine, the electrifying process is controlled on the basis of the volume resistivity of the conductive material P.

The pressure-keeping process as the subroutine of step S76 is described with reference to FIG. 26.

The control unit 100 determines whether or not a pressure-keeping signal output from the injection controller 110 to the heating injection device 2 is ON (step S11).

When the control unit 100 determines that the pressure-keeping signal is ON (YES in step S111), the injection controller 110 controls the heating injection device 2 to end (OFF) filling the conductive material P in the cavity C (step S112).

The electrification by the electrification device 61 then ends (OFF) (step S113).

As described in the context of the eleventh embodiment, the conductive material P has the PVT characteristics shown in FIG. 20 as a mutual relationship among the pressure, the specific volume and the temperature. The description of the eleventh embodiment is applied to the PVT characteristics of the conductive material P.

Figure 32:
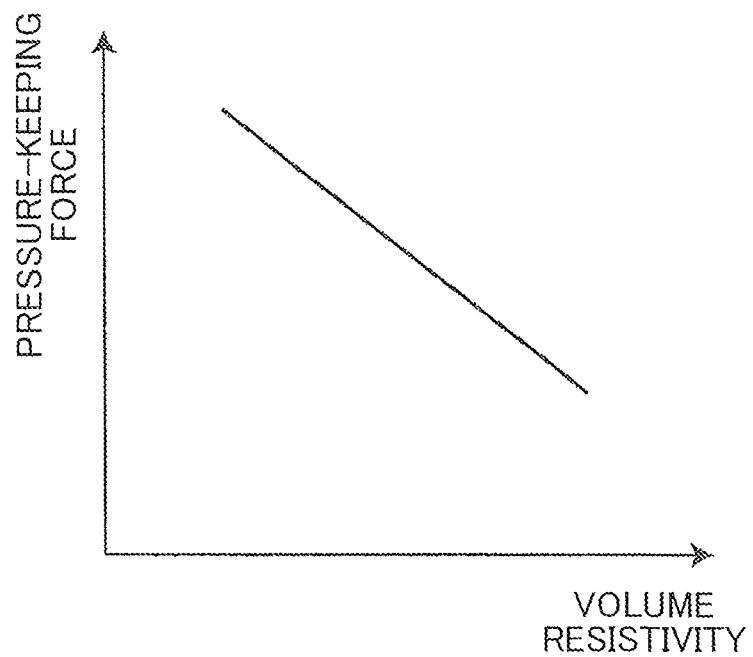
FIG. 32 is a graph showing a relationship between a pressure-keeping force and volume resistivity.

As shown in FIG. 32, the pressure-keeping force is set to a high value when the volume resistivity is low. Accordingly, the specific volume of the conductive material P filled in the cavity is less likely to decrease.

The injection controller 110 sets a pressure-keeping force every shot on the basis of the volume resistivity in accordance with the aforementioned principle of the specific volume keeping (step S114). The injection controller 110 controls the heating injection device 2 to decrease the pressure-keeping force when the volume resistivity is higher than a predetermined threshold. The injection controller 110 controls the heating injection device 2 to increase the pressure-keeping force when the volume resistivity is lower than the predetermined threshold. Accordingly, the specific volume of the conductive material P in the cavity C is kept substantially constant between shots or lots within a predetermined range.

The injection controller 110 eventually starts (ON) pressure-keeping at the pressure-keeping force set by the heating injection device 2 (step S115). The control flow returns to the main routine of FIG. 23.

According to the aforementioned subroutine, the pressure-keeping process is controlled on the basis of the volume resistivity of the conductive material P.

The cooling and plasticizing process as a subroutine of step S77 is described with reference to FIG. 27.

The injection controller 110 determines whether or not a cooling signal output from the cooling controller 130 to the cooling pump 51 is ON (step S121).

When the injection controller 110 determines that the cooling signal is ON (YES in step S121), the pressure-keeping by the heating injection device 2 ends (OFF) (step S122).

The heating injection device 2 uses the band heater 23 to heat and melt the conductive material P to the molten temperature for the next shot. The batching motor 26 rotates and moves the screw 24 backward to a predetermined position. Meanwhile, the material fed from the hopper 22 is heated and melted in the injection cylinder 21. The material fed from the hopper 22 is stored in front of the screw 24 in accordance with the backward movement of the screw 24 (step S123).

Next, the cooling controller 130 sets an in-mold cooling period for cooling the inside of the mold by the cooling pump 51 (step S124). The in-mold cooling period is determined on the basis of measured volume resistivity so that the conductive material P has a predetermined temperature after the cooling.

The cooling controller 130 then controls the cooling pump 51 to start cooling the inside of the mold (step S125).

The cooling controller 130 then determines whether or not the set in-mold cooling period passes from the start of cooling the inside of the mold by the cooling pump 51 (step S126).

Cooling the inside of the mold eventually ends (step S127) if the cooling controller 130 determines that the in-mold cooling period passes in step S126. The control flow returns to the main routine of FIG. 23.

According to the aforementioned subroutine, the cooling process is controlled on the basis of the volume resistivity of the conductive material P.

In the aforementioned various embodiments, the conductive material P injected from the heating injection device 2 is electrically heated by a voltage applied from the electrification device 61 under the control of the electrification controller 140 when the conductive material P comes into contact with the conductive portions 47, 48 of the mold device 4. Therefore, an excessive temperature drop does not happen to the conductive material P moving in the cavity C. Accordingly, an injection pressure is sufficiently transmitted to a leading end of the conductive material P since a temperature drop of the conductive material P is less likely to cause a reduction in fluidity of the conductive material P.

The cavity C is filled with the molten conductive material P at a relatively low injection pressure. Therefore, a deficient injection pressure such as a weld or a short shot is less likely to cause appearance defects or the like. In the case of a large and thin molded product, in particular, a designer may provide a compact structure for each of the injection molding apparatus 1 and the mold device 4. Not the mold device 4, but the conductive material P is electrically heated. Therefore, a drastic temperature rise is less likely to happen to the mold device 4, the mold device 4 having larger heat capacity than the loaded conductive material P. Accordingly, it does not take a long time to cool the mold device 4. This contributes to a decrease in an injection molding cycle, and a reduction in running cost at the molding. According to the principles of the aforementioned embodiments, it is unnecessary to thicken a molded product for improvement of fluidity. Accordingly, the principles of the aforementioned embodiments may prevent an excessive increase in material cost.

If the conductive material P is a resin material containing conductive substances, for example, conductivity required for electrostatic coating may be provided by mixing conductive filler with base insulative resin. Alternatively, a molded product may be strengthened by mixing carbon fibers or the like with the resin material. The aforementioned advantageous effect is obtained under the process of mixing them as well.

According to the aforementioned embodiments, the mold device 4 includes the movable and fixed molds 41, 42. The movable and fixed molds 41, 42 have contact surfaces, respectively, to come into contact with each other when the mold device 4 is closed. The conductive portions 47, 48 are respectively provided on the cavity formation surfaces 411, 421 of the movable and fixed molds 41, 42. At least one of the contact surfaces of the movable and fixed molds 41, 42 has the insulator 49 which electrically insulates the conductive portions 47, 48 from each other. Accordingly, when the voltage is applied between the conductive portions 47, 48, a current does not directly flow between the conductive portions 47, 48 so that the electrification happens to the conductive material P situated between the conductive portions 47, 48.

According to the aforementioned embodiments, the electrification controller 140 controls the electrification device 61 on the basis of an injection state of the conductive material P, the injection state being represented by by a control signal output from the injection controller 110. Therefore, the electrification is started in coincidence with injection of the conductive material P. Accordingly, the conductive material P is electrically heated effectively.

According to the aforementioned embodiments, since a voltage application between the conductive portions 47, 48 is stopped before the cavity C is filled with the conductive material P completely, it takes a short time to cool a molded product.

According to the aforementioned embodiments, a condition for at least one of the pressure-keeping process, the electrifying process and the cooling process is controlled on the basis of an in-mold resistance value of the conductive material P measured by the in-mold resistance value sensor 63. Therefore, an actual state change of the conductive material P in the mold 4 is detected on the basis of a change in the in-mold resistance value measured by the in-mold resistance value sensor 63. The conditions of the pressure-keeping process, the electrifying process and the cooling process may be controlled during the injection molding in response to the change in the in-mold resistance value. In this case, the injection molding is executed under accurate control. The conditions of the pressure-keeping process, the electrifying process and the cooling process are controlled so that influential variations in the in-mold resistance value is canceled even when the in-mold resistance value of the conductive material P varies between lots or shots. Accordingly, a status change of the conductive material P or variations in electrical resistance value during the injection molding are less likely to cause appearance defects or the like of a molded product. Consequently, high quality of the molded product is stably obtained.

In the aforementioned embodiments, the in-mold resistance value between the conductive portions 47, 48 is measured. The electrification controller 140 sets a voltage to a low value when the measured electrical resistance value of the conductive material P is high, the voltage being applied between the conductive portions 47, 48 from the electrification device 61 in the electrifying process. The electrification controller 140 sets the voltage to a high value when the electrical resistance is low. The electrification controller 140 controls the voltage value so that a temperature of the conductive material P injected into the mold 4 falls within a predetermined range. Therefore, an inappropriate voltage value in the electrification of the electrifying process is less likely to cause appearance defects or the like of a molded product. Consequently, high quality of the molded product is stably obtained.

According to the aforementioned embodiments, the injection controller 110 sets a pressure-keeping force of the heating injection device 2 to a low value in the pressure-keeping process when the measured electrical resistance is high. The injection controller 110 sets the pressure-keeping force to a high value when the electrical resistance is low. The electrification controller 140 controls the pressure-keep so that a specific volume of the conductive material P injected into the mold 4 falls within a predetermined range. Therefore, an inappropriate pressure-keeping force in the pressure-keeping process is less likely to cause appearance defects or the like of a molded product. Consequently, high quality of the molded product is stably obtained.

In the aforementioned embodiments, the cooling controller 130 determines in the cooling process that a temperature of the conductive material P in the mold is high when the measured electrical resistance value is high. The temperature of the conductive material in the mold 4 is determined to be low when the electrical resistance value is low. The cooling controller 130 ends the cooling operation of the cooling pump 51 when the temperature of the conductive material P in the mold 4 falls within a predetermined range. Therefore, inappropriate cooling in the cooling process is less likely to cause appearance defects or the like of a molded product. Consequently, high quality of the molded product is stably obtained.

According to the aforementioned embodiments, a condition for at least one of the injecting process, the pressure-keeping process, the electrifying process and the cooling process in the injection molding cycle is controlled on the basis of a volume resistance value of the conductive material P measured by the resistance sensor 62. Accordingly, the control in correspondence to the volume resistance value of the conductive material P is executed in the injecting process, the pressure-keeping process, the electrifying process and the cooling process even when the volume resistance value of the conductive material P varies between lots or shots. Therefore, variations in the volume resistance value are less likely to cause appearance defects or the like of a molded product.

According to the aforementioned embodiments, the resistance sensor 62 measures volume resistivity of the conductive material P molten in the injection cylinder 21. The electrification controller 140 controls the electrification device 61 to set a voltage to be applied between the conductive portions 47, 48 to a low value when the volume resistivity of the conductive material P measured in the electrifying process is high. The electrification controller 140 sets the voltage to a high value when the volume resistivity is low. The electrification controller 140 controls the electrification device 61 so that a temperature of the conductive material P injected into the mold 4 falls within a predetermined range. Therefore, an inappropriate voltage value in the electrification of the electrifying process is less likely to cause appearance defects or the like of a molded product. Consequently, high quality of the molded product is stably obtained.

According to the aforementioned embodiments, the injection controller 110 controls the heating injection device 2 to set a pressure-keeping force to a low value in the pressure-keeping process when the measured volume resistivity is high. The injection controller 110 sets the pressure-keeping force to a high value when the volume resistivity is low. The injection controller 110 controls the heating injection device 2 so that a specific volume of the conductive material P injected into the mold 4 falls within a predetermined range. Therefore, an inappropriate pressure-keeping force in the pressure-keeping process is less likely to cause appearance defects or the like of a molded product. Consequently, high quality of the molded product is stably obtained.

According to the aforementioned embodiments, the cooling controller 130 determines that a temperature of the conductive material P in the mold is high in the cooling process when the measured volume resistivity is high. The cooling controller 130 determines that a temperature of the conductive material in the mold 4 is low when the volume resistivity is low. The cooling controller 130 controls the cooling pump 51 to end cooling when the temperature of the conductive material P in the mold 4 falls within a predetermined range. Therefore, inappropriate cooling in the cooling process is less likely to cause appearance defects or the like of a molded product. Consequently, high quality of the molded product is stably obtained.

The principles of the aforementioned embodiments should not be limited to the descriptions of the exemplificative embodiments. A person skilled in the art may make various kinds of improvements and design changes within a range which does not deviate from the principles of the aforementioned embodiments.

In the present embodiments, the resin material is injected and molded as a conductive material. Alternatively, a molten material having conductivity at least at the heating may be adopted. Therefore, the principles of the aforementioned embodiments may be applied to, for example, a die casting machine for injecting and molding a metal material of aluminum or the like.

In the aforementioned embodiments, the conductive portion 48 has a higher potential than the conductive portion 47 at the voltage application between the conductive portions 47, 48. Alternatively, the conductive portion 48 may have a lower potential than the conductive portion 47.

With regard to the aforementioned embodiments, the heating injection device 2 and the mold-clamping device 3 utilize a hydraulic actuator as a drive source. Alternatively, an electric actuator may be used as the drive source.

With regard to the aforementioned embodiments, the mold device 4 is cooled by the coolant circulated by the cooling pump 51. However, the principles of the present embodiments do not necessarily require equipment for cooling the mold device 4. Therefore, the mold device 4 may be cooled by natural heat dissipation from the mold device 4. Alternatively, for example, the mold device 4 may be cooled actively by a cooling way using peltier elements.

With regard to the aforementioned embodiments, conditions of the injecting process, the electrifying process, the pressure-keeping process and the cooling process in the injection molding cycle are controlled on the basis of the in-mold resistance value and/or the volume resistance value. Alternatively, a condition for at least one of the electrifying process, the pressure-keeping process and the cooling process may be controlled. When conditions for a plurality of processes are controlled, the control may be executed to compensate the processes one another.

The exemplary molding techniques described with reference to the aforementioned various embodiments mainly include the following features.

An injection molding apparatus according to one aspect of the aforementioned embodiments includes a heating injector which heats and melts a conductive material to a molten temperature, the heating injector injecting the conductive material into a mold with a cavity formation surface which forms a cavity. The injection molding apparatus includes an electrifying portion configured to apply a voltage, and a controller including an electrification controller configured to control the voltage which is applied by the electrifying portion. The mold includes conductive portions at least on a part of the cavity formation surface. The conductive portions are insulated from each other. The electrifying portion applies the voltage between the conductive portions. The conductive material injected from the heating injector is electrically heated by the voltage, which is applied from the electrifying portion under control of the electrification controller, when the conductive material comes in contact with the conductive portions.

According to the aforementioned configuration, when the conductive material injected from the heating injector comes in contact with the conductive portions, the conductive material is electrically heated by a voltage applied from the electrifying portion under control of the electrification controller. Therefore, a decrease in a temperature is less likely to happen to the conductive material moving in the cavity. This means that a decrease in fluidity resultant from the temperature drop is less likely to happen to the conductive material. Consequently, an injection pressure is well transmitted to a leading end of the conductive material even if the injection pressure is low.

As a result of the sufficient transmission of the injection pressure to the leading end of the conductive material, appearance defects such as a short shot and the like resultant from a deficient injection pressure is less likely to occur. In particular, with regard to a large and thin molded product, a designer may design a compact injection molding apparatus and a compact mold. Since not the mold but the conductive material is electrically heated, a temperature rise is less likely to happen to the mold which has larger heat capacity than the loaded conductive material. Accordingly, it does not take a long time to cool a molded product. In short, the injection molding cycle does not become so long. This contributes to a reduction in running cost of the molding. The designer does not have to thicken a molded product in order to improve fluidity. This further contributes to prevention of an extreme increase in material cost.

With regard to the aforementioned configuration, the controller may control the electrifying portion to stop applying the voltage between the conductive portions before the cavity is filled with the conductive material completely.

According to the aforementioned configuration, since the application of the voltage between the conductive portions is stopped before the cavity is filled with the conductive material completely, it becomes short to cool a molded product.

With regard to the aforementioned configuration, the injection molding apparatus may further include a cooler configured to supply coolant to a passage formed in the mold. The controller may include a cooling controller configured to control the cooler. The cooling controller may control the cooler to start supplying the coolant into the mold when an application of the voltage is stopped.

According to the aforementioned configuration, since the cooling controller controls the cooler to start supplying the coolant into the mold when the application of the voltage is stopped, it takes short to cool a molded product.

With regard to the aforementioned configuration, the injection molding apparatus may further include a measuring portion configured to measure a parameter value about an electrical resistance value between the conductive portions. The mold may include a first insulator configured to electrically insulate the conductive portions from an outer surface of the mold. The controller may control a condition of at least one of an electrifying operation of applying the voltage and a pressure-keeping operation of keeping a pressure to the conductive material filled in the mold, based on a difference value between the parameter value measured under a state in which there is no injection of the conductive material into the mold and the parameter value measured under a state in which the conductive material is injected into the mold.

According to the aforementioned configuration, since the controller may control a condition of at least one of the electrifying operation of applying electrification and the pressure-keeping operation of keeping the pressure to the conductive material, on the basis of a difference value between the parameter value measured under a state in which there is no injection of the conductive material into the mold and the parameter value measured in a state in which the conductive material is injected into the mold, a change in an actual state of the conductive material in the mold is detected in accordance with a change in the parameter value measured by the measuring portion. Since the condition for at least one of the electrifying operation and the pressure-keeping operation is controlled in response to the change in the parameter value, the injection molding is accurately executed. Variations in an electrical resistance value become less influential due to the aforementioned control even when the electrical resistance value of the conductive material varies between lots or shots. Variations in a state of the conductive material or the electrical resistance value during the injection molding are less likely to cause appearance defects or the like of molded products.

With regard to the aforementioned configuration, the measuring portion may measure the electrical resistance value between the conductive portions as the parameter value. The electrification controller may control the electrifying portion to decrease the voltage when the electrical resistance value measured by the measuring portion is higher than a predetermined threshold, and to increase the voltage when the electrical resistance value measured by the measuring portion is lower than the threshold.

According to the aforementioned configuration, since the electrification controller controls the electrifying portion to decrease the voltage when the electrical resistance value measured by the measuring portion is higher than the predetermined threshold, and to increase the voltage when the electrical resistance value is lower than the threshold, a temperature of the conductive material injected into the mold falls within a predetermined range. Accordingly, appearance defects or the like resultant from an inappropriate electrification voltage value are less likely to happen to molded products. Consequently, high quality of the molded products may be stably obtained.

With regard to the aforementioned configuration, the measuring portion may measure the electrical resistance value between the conductive portions as the parameter value. The controller may include an injection controller configured to control a pressure-keeping force which is applied to the conductive material in the pressure-keeping operation. The injection controller may control the heating injector to decrease the pressure-keeping force when the electrical resistance value measured by the measuring portion is higher than a predetermined threshold, and to increase the pressure-keeping force when the electrical resistance value measured by the measuring portion is lower than the threshold.

According to the aforementioned configuration, since the injection controller controls the heating injector to decrease the pressure-keeping force when the electrical resistance value measured by the measuring portion is higher than the predetermined threshold, and to increase the pressure-keeping force when the electrical resistance value measured by the measuring portion is lower than the threshold, a specific volume of the conductive material injected into the mold falls within a predetermined range. Accordingly, appearance defects or the like resultant from an inappropriate pressure-keeping force are less likely to happen to molded products. Consequently, high quality of the molded products may be stably obtained.

In the aforementioned configuration, the injection molding apparatus may further include a cooler configured to supply coolant to a passage formed in the mold. The controller may include a cooling controller configured to control the cooler. The measuring portion may measure the electrical resistance value between the conductive portions as the parameter value. The cooling controller may control the cooler to end cooling the mold when the electrical resistance value measured by the measuring portion is lower than a predetermined threshold.

According to the aforementioned configuration, since the cooling controller controls the cooler to end cooling the mold when the electrical resistance value measured by the measuring portion is lower than the predetermined hold value, appearance defects or the like resultant from an inappropriate cooling are less likely to happen to molded products. Consequently, high quality of the molded products may be stably obtained.

With regard to the aforementioned configuration, the mold may include a first member having a first contact surface, and a second member having a second contact surface to come into contact with the first member when the mold is closed. Each of the first and second members may include the cavity formation surface. At least one of the first and second contact surfaces may include a second insulator configured to electrically insulate the conductive portions from each other.

According to the aforementioned configuration, since the at least one of the first and second contact surfaces includes the second insulator configured to electrically insulate the conductive portions from each other, the conductive material between the conductive portions is electrically heated appropriately while a current is less likely to directly flow between the conductive portions.

With regard to the aforementioned configuration, since the injection molding apparatus may include a measuring portion configured to measure a parameter value about an electrical resistance value between the conductive portions. The controller may control a condition of at least one of an electrifying operation of applying the voltage, a pressure-keeping operation of keeping a pressure to the conductive material filled in the mold, and a cooling operation of cooling the mold, based on the parameter value measured by the measuring portion.

According to the aforementioned configuration, since the controller controls a condition for at least one of the electrifying operation of applying the voltage, the pressure-keeping operation of keeping a pressure to the conductive material filled in the mold and the cooling operation of cooling the mold on the basis of the parameter value measured by the measuring portion, at least one of the electrifying operation, the pressure-keeping operation and the cooling operation is appropriately controlled in response to the electrical resistance value even when an electrical resistance value of the conductive material varies between lots or shots. Consequently, variations in the volume resistance value are less likely to cause appearance defects or the like of molded products.

With regard to the aforementioned configuration, the measuring portion may measure volume resistivity of the conductive material heated and melted by the heating injector as the parameter value. The electrification controller may control the electrifying portion to decrease the voltage when the volume resistivity is higher than a predetermined threshold, and to increase the voltage when the volume resistivity is lower than the threshold.

According to the aforementioned configuration, since the electrification controller controls the electrifying portion to decrease the voltage when the volume resistively is high, and to increase the voltage when the volume resistivity is low, a temperature of the conductive material injected into the mold falls within a predetermined range. Accordingly, appearance defects or the like are less likely to happen to molded products during the electrifying operation. Consequently, high quality of the molded products may be stably obtained.

With regard to the aforementioned configuration, the measuring portion may measure volume resistivity of the conductive material heated and melted by the heating injector as the parameter value. The heating injector may provide a pressure-keeping force to the conductive material in the pressure-keeping operation. The controller may include an injection controller configured to control the pressure-keeping force. The injection controller may control the heating injector to decrease the pressure-keeping force when the volume resistivity is higher than a predetermined threshold, and to increase the pressure-keeping force when the volume resistivity is lower than the threshold.

According to the aforementioned configuration, since the injection controller controls the heating injector to decrease the pressure-keeping force when the volume resistivity is high, and to increase the pressure-keeping force when the volume resistivity is low, a specific volume of the conductive material injected into the mold falls within a predetermined range. Accordingly, appearance defects or the like resultant from an inappropriate pressure-keeping force in the pressure-keeping process are less likely to happen to molded products. Consequently, high quality of the molded products may be stably obtained.

With regard to the aforementioned configuration, the injection molding apparatus may further include a cooler configured to supply coolant to a passage formed in the mold. The controller may include a cooling controller configured to control the cooler. The measuring portion may measure volume resistivity of the conductive material heated and melted by the heating injector. The cooling controller may set a time length based on the volume resistivity which is measured by the measuring portion, the mold being cooled during the time length.

According to the aforementioned configuration, since the cooling controller sets a time length during which the mold is cooled in response to the volume resistivity measured by the measuring portion, appearance defects or the like resultant from inappropriate cooling are less likely to happen to molded products. Consequently, high quality of the molded products may be stably obtained.

With regard to the aforementioned configuration, the conductive material may be made of a resin material containing a conductive substance.

According to the aforementioned configuration, since the conductive material is made of a resin material containing a conductive substrate, conductive filler may be mixed with base insulating material. In this case, conductivity required for electrostatic coating is provided to molded products.

Alternatively, the resin material may contain carbon fibers or the like. In this case, molded products may have high strength.

With regard to the aforementioned configuration, the mold may include a first member having a first contact surface, and a second member having a second contact surface to come into contact with the first member when the mold is closed. Each of the first and second members includes the cavity formation surface. The conductive portions may be provided on the cavity formation surface of each of the first and second members. At least one of the first and second contact surfaces may include an insulator configured to electrically insulate the conductive portions from each other.

According to the aforementioned configuration, since the at least one of the first and second contact surfaces includes the insulator configured to electrically insulate the conductive portions from each other, the conductive material between the conductive portions is electrically heated appropriately while a current is less likely to directly flow between the conductive portions is suppressed.

With regard to the aforementioned configuration, the controller may include an injection controller configured to control the heating injector which heats and injects the conductive material. The electrification controller may control the electrifying portion, based on an injection state of the conductive material, the injection state being represented by a control signal output from the injection controller.

According to the aforementioned configuration, the electrification controller controls the electrifying portion on the basis of an injection state of the conductive material, the injection state being represented by a control signal output from the injection controller. Therefore, the electrification is started in coincidence with injection of the conductive material. Consequently, the conductive material is electrically heated effectively.

An injection molding method according to one aspect of the aforementioned embodiment is used for injecting a conductive material into a mold having a cavity formation surface, which forms a cavity, in order to mold the conductive material. The injection molding method includes a heating and melting process of heating and melting the conductive material to a molten temperature; an injecting process of injecting the heated and molten conductive material into the mold; and an electrifying process of applying a voltage between conductive portions provided at least on a part of the cavity formation surface so that the injected conductive material is electrically heated when the injected conductive material comes in contact with the conductive portions which are insulated from each other.

According to the aforementioned configuration, when the injected conductive material comes into contact with the conductive portions, the conductive material is electrically heated by an applied voltage. Therefore, a temperature drop is less likely to happen to the conductive material moving in the cavity. This means that a decrease in fluidity resultant from the temperature drop is less likely to happen to the conductive material. Therefore, an injection pressure is well transmitted to a leading end of the conductive material even when the injection pressure applied to the conductive material is low.

As a result of the sufficient transmission of the injection pressure to the leading end of the conductive material, appearance defects such as a short shot or the like resultant from a deficient injection pressure are less likely to occur. In particular, with regard to a large and thin molded product, a designer may design a compact injection molding apparatus and a compact mold. Since not the mold, but the conductive material is electrically heated, a temperature rise is less likely to happen to the mold which has larger heat capacity than the loaded conductive material. Accordingly, it does not take a long time to cool a molded product. In short, an injection molding cycle becomes short. This contributes to a reduction in running cost of the molding. The designer does not have to thicken a molded product in order to improve fluidity. This further contributes to prevention of an excessive increase in material cost.

With regard to the aforementioned configuration, the electrifying process may include stopping applying the voltage before the cavity is filled with the conductive material completely.

According to the aforementioned configuration, since an application of the voltage between the conductive portions is stopped before the cavity is filled with the conductive material completely, it takes short to cool a molded product.

With regard to the aforementioned configuration, the injection molding method may further include a cooling process of supplying coolant into the mold. The cooling process may be executed in coincidence with an application stop of the voltage.

According to the aforementioned configuration, since the cooling process is started when an application of the voltage is stopped, it takes short to cool a molded product.

With regard to the aforementioned configuration, the injection molding method may further include a measuring process of measuring a parameter value about an electrical resistance value between the conductive portions; a pressure-keeping process of keeping a pressure to the conductive material filled in the cavity; and a cooling process of supplying coolant into the mold. A condition for at least one of the electrifying process, the pressure-keeping process and the cooling process is controlled, based on the parameter value measured in the measuring process.

According to the aforementioned configuration, since a condition for at least one of the electrifying process, the pressure-keeping process and the cooling process is controlled in response to a change in the electrical resistance value, the injection molding is accurately executed. Variations in the electrical resistance value become less influential due to the aforementioned control even when the electrical resistance value of the conductive material varies between lots or shots. Therefore, variations in a state of the conductive material or the electrical resistance value during the injection molding are less likely to cause appearance defects or the like of molded products.

With regard to the aforementioned configuration, the measuring process may include measuring an electrical resistance value between the conductive portions. The electrifying process may include (i) decreasing the voltage when the electrical resistance value is high; and (ii) increasing the voltage when the electrical resistance value is low.

According to the aforementioned configuration, the voltage is decreased when the electrical resistance value is higher than a predetermined threshold. The voltage is increased when the electrical resistance value is lower than the threshold. Therefore, a temperature of the conductive material injected into the mold falls within a predetermined range. Accordingly, an inappropriate electrification voltage value is less likely to cause appearance defects or the like of molded products. Consequently, high quality of molded products is stably obtained.

With regard to the aforementioned configuration, the measuring process may include measuring an electrical resistance value between the conductive portions. The pressure-keeping process may include: (i) decreasing a pressure-keeping force, which is applied to the conductive material, when the electrical resistance value is higher than a predetermined threshold; and (ii) increasing the pressure-keeping force when the electrical resistance value is lower than the threshold.

According to the aforementioned configuration, the pressure-keeping force is decreased when the electrical resistance value measured by the measuring portion is higher than the predetermined threshold. The pressure-keeping force is increased when the electrical resistance value measured by the measuring portion is lower than the threshold. Therefore, a specific volume of the conductive material injected into the mold falls within a predetermined range. Accordingly, an inappropriate pressure-keeping force in the pressure-keeping process is less likely to cause appearance defects or the like of molded products. Consequently, high quality of molded products is stably obtained.

With regard to the aforementioned configuration, the measuring process may include measuring an electrical resistance value between the conductive portions. The cooling process may end when the electrical resistance value is lower than a predetermined threshold.

According to the aforementioned configuration, since the cooling process ends when the electrical resistance value is lower than the predetermined threshold, inappropriate cooling is less likely to cause appearance defects or the like of molded products. Consequently, high quality of molded products is stably obtained.

With regard to the aforementioned configuration, the injection molding method may further include a measuring process of measuring a parameter value about volume resistivity between the conductive portions; a pressure-keeping process of keeping a pressure to the conductive material filled in the cavity; and a cooling process of supplying coolant into the mold. A condition of at least one of the electrifying process, the pressure-keeping process and the cooling process may be controlled, based on the parameter value.

According to the aforementioned configuration, since a condition for at least one of the electrifying process, the pressure-keeping process, and the cooling process is controlled on the basis of the parameter value, the at least one of the electrifying process, the pressure-keeping process and the cooling process is appropriately controlled on the basis of the electrical resistance value even when the electrical resistance value varies between lots or shots. Accordingly, variations in the volume resistance value are less likely to cause appearance defects or the like of molded products.

With regard to the aforementioned configuration, the measuring process may include measuring volume resistivity between the conductive portions. The electrifying process may include: (i) decreasing the voltage when the volume resistivity is higher than a predetermined threshold; and (ii) increasing the voltage when the volume resistivity is lower than the threshold.

According to the aforementioned configuration, the voltage is decreased when the volume resistivity is high. The voltage is increased when the volume resistivity is low. Therefore, a temperature of the conductive material injected into the mold falls within a predetermined material. Accordingly, appearance defects or the like are less likely to happen to molded products. Consequently, high quality of molded products is stably obtained.

With regard to the aforementioned configuration, the measuring process may include measuring volume resistivity between the conductive portions. The pressure-keeping process may include: (i) decreasing a pressure-keeping force, which is applied to the conductive material, when the volume resistivity is higher than a predetermined threshold; and (ii) increasing the pressure-keeping force when the volume resistivity is lower than the threshold.

According to the aforementioned configuration, the pressure-keeping force is decreased when the volume resistivity is high. The pressure-keeping force is increased when the volume resistivity is low. Therefore, a specific volume of the conductive material injected into the mold falls within the predetermined range. Accordingly, an inappropriate pressure-keeping force is less likely to cause appearance defects or the like of molded products. Consequently, high quality of molded products is stably obtained.

With regard to the aforementioned configuration, the measuring process may include measuring volume resistivity between the conductive portions. The cooling process may include setting a time length, based on the volume resistivity, the coolant being supplied into the mold during the time length.

According to the aforementioned configuration, the cooling process includes setting a time length on the basis of the volume resistivity, the coolant being supplied into the mold during the time length. Therefore, inappropriate cooling is less likely to cause appearance defects or the like of molded products. Consequently, high quality of molded products is stably obtained.

With regard to the aforementioned configuration, the conductive material may be made of a resin material containing a conductive substance.

According to the aforementioned configuration, since the conductive material is made of a resin material containing a conductive substrate, conductive filler may be mixed with base insulating material. In this case, conductivity required for electrostatic coating is provided to molded products. Alternatively, the resin material may contain carbon fibers or the like. In this case, the molded product may have high strength.

With regard to the aforementioned configuration, an execution timing of the electrifying process may be controlled, based on an injection state of the conductive material, the injection state being represented by a control signal to control the injecting process.

According to the aforementioned configuration, the injecting process is controlled on the basis of an injection state of the conductive material, the injection state being represented by a control signal output from the injection controller. Therefore, the electrification is started in coincidence with injection of the conductive material. Consequently, the conductive material is electrically heated effectively.

INDUSTRIAL APPLICABILITY OF THE INVENTION

The principles of the aforementioned embodiments are applicable to various technical fields which require injection molding of a conductive material.

The invention claimed is:

1. An injection molding method for injecting a conductive material into a mold having a cavity formation surface, which forms a cavity, in order to mold the conductive material, the injection molding method comprising:
   a heating and melting process of heating and melting the conductive material to a molten temperature;
   an injecting process of injecting the heated and molten conductive material into the mold; and
   an electrifying process of applying a voltage between conductive portions provided at least on a part of the cavity formation surface so that the injected conductive material is electrically heated when the injected conductive material comes in contact with the conductive portions which are insulated from each other.

2. The injection molding method according to claim 1, wherein the electrifying process includes stopping applying the voltage before the cavity is filled with the conductive material completely.

3. The injection molding method according to claim 2, further comprising:
   a cooling process of supplying coolant into the mold,
   wherein the cooling process is executed in coincidence with an application stop of the voltage.

4. The injection molding method according to claim 1, further comprising:
   a measuring process of measuring a parameter value about an electrical resistance value between the conductive portions;
   a pressure-keeping process of keeping a pressure to the conductive material filled in the cavity; and
   a cooling process of supplying coolant into the mold,
   wherein a condition for at least one of the electrifying process, the pressure-keeping process and the cooling process is controlled, based on the parameter value measured in the measuring process.

5. The injection molding method according to claim 4, wherein the measuring process includes measuring an electrical resistance value between the conductive portions, and
   wherein the electrifying process includes:
   (i) decreasing the voltage when the electrical resistance value is higher than a predetermined threshold; and
   (ii) increasing the voltage when the electrical resistance value is lower than the threshold.

6. The injection molding method according to claim 4, wherein the measuring process includes measuring an electrical resistance value between the conductive portions, and
   wherein the pressure-keeping process includes:
   (i) decreasing a pressure-keeping force, which is applied to the conducive material, when the electrical resistance value is higher than a predetermined threshold; and
   (ii) increasing the pressure-keeping force when the electrical resistance value is lower than the threshold.

7. The injection molding method according to claim 4, wherein the measuring process includes measuring an electrical resistance value between the conductive portions, and
   wherein the cooling process ends when the electrical resistance value is lower than a predetermined threshold.

8. The injection molding method according to claim 1, further comprising:
   a measuring process of measuring a parameter value about volume resistivity between the conductive portions;
   a pressure-keeping process of keeping a pressure to the conductive material filled in the cavity; and
   a cooling process of supplying coolant into the mold,
   wherein a condition of at least one of the electrifying process, the pressure-keeping process and the cooling process is controlled, based on the parameter value.

9. The injection molding method according to claim 8,
wherein the measuring process includes measuring volume resistivity between the conductive portions, and
wherein the electrifying process includes:
  (i) decreasing the voltage when the volume resistivity is higher than a predetermined threshold; and
  (ii) increasing the voltage when the volume resistivity is lower than the threshold.

10. The injection molding method according to claim 8,
wherein the measuring process includes measuring volume resistivity between the conductive portions, and
wherein the pressure-keeping process includes:
  (i) decreasing a pressure-keeping force, which is applied to the conductive material, when the volume resistivity is higher than a predetermined threshold; and
  (ii) increasing the pressure-keeping force when the volume resistivity is lower than the threshold.

11. The injection molding method according to claim 8,
wherein the measuring process includes measuring volume resistivity between the conductive portions, and
wherein the cooling process includes setting a time length, based on the volume resistivity, the coolant being supplied into the mold during the time length.

12. The injection molding method according to claim 1,
wherein the conductive material is made of a resin material containing a conductive substance.

13. The injection molding method according to claim 1,
wherein an execution timing of the electrifying process is controlled, based on an injection state of the conductive material, the injection state being represented by a control signal to control the injecting process.

* * * * *